United States Patent
Kadowaki et al.

(10) Patent No.: US 7,349,579 B2
(45) Date of Patent: Mar. 25, 2008

(54) IMAGE PROCESSING DEVICE, IMAGE PROCESSING METHOD, AND IMAGE READING METHOD

(75) Inventors: Yukio Kadowaki, Nara (JP); Mitsutaka Iwasaki, Kanagawa (JP); Yutaka Sato, Kanagawa (JP); Kazuhiro Miyazaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 797 days.

(21) Appl. No.: 10/247,896

(22) Filed: Sep. 20, 2002

(65) Prior Publication Data

US 2003/0152280 A1 Aug. 14, 2003

(30) Foreign Application Priority Data

Sep. 25, 2001 (JP) .............................. 2001-292590

(51) Int. Cl.
*G06K 9/36* (2006.01)
*G06K 9/46* (2006.01)

(52) U.S. Cl. ...................... 382/240; 382/162; 382/167; 382/232; 382/233; 382/251; 375/240.19; 375/240.22; 358/1.9; 358/474

(58) Field of Classification Search ................ 382/162, 382/164, 166, 167, 232, 233, 239, 240, 244, 382/245, 246, 248, 250, 251; 358/1.9, 474, 358/487, 505; 375/240.02, 240.22, 240.19
See application file for complete search history.

(56) References Cited

U.S. PATENT DOCUMENTS

| | | | |
|---|---|---|---|
| 4,958,311 A | 9/1990 | Kadowaki et al. | |
| 5,016,207 A | 5/1991 | Fujii et al. | |
| 5,048,179 A | 9/1991 | Shindo et al. | |
| 5,119,045 A | 6/1992 | Sato | |
| 5,252,917 A | 10/1993 | Kadowaki | |
| 5,337,168 A | 8/1994 | Fujii et al. | |
| 5,349,610 A | 9/1994 | Sakamoto et al. | |
| 5,517,108 A | 5/1996 | Kadowaki | |

(Continued)

FOREIGN PATENT DOCUMENTS

JP 10-84484 3/1998

(Continued)

OTHER PUBLICATIONS

Jan. 30, 2007 official action in connection with Japanese Patent Application No. 2001-292590.

(Continued)

*Primary Examiner*—Matthew C. Bella
*Assistant Examiner*—Ali A. B Bayat
(74) *Attorney, Agent, or Firm*—Cooper & Dunham LLP

(57) ABSTRACT

The present invention provides an image processing device, an image processing method, and an image reading method, by which encoded data can be easily generated from sub-sampled image data, without a complicated circuit or an increase in the data amount. A one-dimensional wavelet transform in a predetermined direction is omitted in stage 1, where components 1 and 2 of input image data have been sub-sampled. When coefficient data generated through such a two-dimensional wavelet transform are to be encoded, sub-bands that are not contained in the coefficient data in comparison with the coefficient data of a component 0 should be considered to have been truncated.

18 Claims, 15 Drawing Sheets

U.S. PATENT DOCUMENTS

| | | | |
|---|---|---|---|
| 5,611,021 A | 3/1997 | Kadowaki et al. | |
| 5,673,043 A | 9/1997 | Hayashi et al. | |
| 5,680,516 A | 10/1997 | Kadowaki et al. | |
| 5,742,801 A | 4/1998 | Fukushima et al. | |
| 5,794,067 A | 8/1998 | Kadowaki | |
| 5,918,253 A | 6/1999 | Kadowaki | |
| 6,066,978 A | 5/2000 | Kadowaki | |
| 6,067,383 A * | 5/2000 | Taniguchi et al. | 382/240 |
| 6,118,902 A * | 9/2000 | Knowles | 382/240 |
| 6,154,493 A * | 11/2000 | Acharya et al. | 375/240.19 |
| 6,665,444 B1 * | 12/2003 | Kajiwara | 382/240 |
| 6,853,466 B1 * | 2/2005 | Harada et al. | 358/1.9 |
| 6,970,602 B1 * | 11/2005 | Smith et al. | 382/232 |
| 2001/0003544 A1 * | 6/2001 | Kajiwara et al. | 382/240 |
| 2001/0012407 A1 * | 8/2001 | Takeo | 382/260 |
| 2002/0005909 A1 * | 1/2002 | Sato | 348/559 |
| 2002/0172418 A1 * | 11/2002 | Hu | 382/166 |
| 2003/0053702 A1 * | 3/2003 | Hu | 382/238 |

FOREIGN PATENT DOCUMENTS

| | | |
|---|---|---|
| JP | 11-4343 | 1/1999 |
| JP | 2000-134639 | 5/2000 |
| JP | 2000-270355 | 9/2000 |
| JP | 2001-231041 | 8/2001 |

OTHER PUBLICATIONS

Jun. 12, 2007 official action in connection with Japanese Patent Application No. 2001-292590.

* cited by examiner

IMAGE PROCESSING DEVICE, IMAGE PROCESSING METHOD, AND IMAGE READING METHOD

BACKGROUND OF THE INVENTION

1. Field of the Invention

The present invention relates to image processing devices, image processing methods, and image reading methods, and, more particularly, to an image processing device, an image processing method, and an image reading method that conform to JPEG-2000.

2. Description of the Related Art

In recent years, "JPEG-2000" has been standardized as the next-generation international standard still-image compression method.

The "JPEG-2000" is a compression method developed to follow "JPEG (Joint Photographic Experts Group)", which is currently the mainstream as a still-image compression technique for forming images suitable for the Internet and digital still cameras. Currently, the part specifying the data compression technique in the "JPEG", which is referred to as "Part-1", is considered to be the international standard.

The compression method according to the JPEG-2000 differs greatly from that according to the current JPEG in that wavelet transforms are employed. FIG. 2 illustrates a general encoding-decoding operation in accordance with the JPEG-2000 employing the wavelet transforms.

In the structure shown in FIG. 2, image data input through the left side is encoded and output through the right side, and encoded data input through the right side is decoded and output through the left side.

More specifically, a color converter 10 color-converts input image data. For example, image data input in the form of RGB (R represents red, G represents green, and B represents blue) is converted into the form of YCbCr (Y represents brightness, and Cb and Cr represents color differences), and vice versa. In the following, a set of expressions (1) that can be applied to a color conversion of RGB image data is shown as an example.

$$G=Yr-(Cr+Cb-2)/4 \ Y=(R+2G+B)/4$$

$$R=Cr+G \ Cr=R-G$$

$$B=Cb+G \ Cb=B-G \tag{1}$$

However, the color converter 10 is not necessarily included in the structure shown in FIG. 2, and functions only if necessary.

In the structure shown in FIG. 2, a wavelet transform unit 20 performs a plural-level two-dimensional discrete wavelet transform (DWT) on the components of the image data separately from one another. At this stage, the two-dimensional discrete wavelet transform can be performed by dividing the image to be processed into a plurality of rectangular blocks called tiles. In this case of dividing the image into a plurality of tiles, the wavelet transform unit 20, a quantizer 30, and an entropy encoder 60 carry out each process for each tile.

A Case of Performing Wavelet Transforms on Components that have not Been Sub-Sampled In the following, a case where image data made up of three components (Component 0 is Y, Component 1 is Cb, and Component 2 is Cr, for example) that have not been sub-sampled are divided into tiles each consisting of 128× 128 pixels and then subjected to a level-3 two-dimensional discrete wavelet transform will be described by way of examples.

An integer discrete wavelet transform that is a reversible one of the wavelet transforms employed in the JPEG-2000 can be represented by the following set of expressions (2):

$$L(k)=x(2k)+[H(k)+H(k+1)]/4$$

$$H(k)=x(2k-1)-[x(2k)+(2k-2)]/2 \tag{2}$$

In the above expressions, x(k) represents the pixel value at a point k (i.e., a pixel k on a tile). Also, L represents smoothing, and H represents edge detection.

When a two-dimensional discrete wavelet transform of 3 levels is performed in accordance with the above set of expressions (2), the data of each of the three components described above are converted into coefficient data consisting of 10 sub-bands, as shown in FIG. 4. Further, FIG. 8 shows the structure of a component that has been converted into coefficient data consisting of 10 sub-bands (3LL, 3HL, 3HH, 3LH, 2HL, 2LH, 2HH, 1HL, 1LH, and 1HH). Taking an example from the sub-bands, "3HL" represents a sub-band that is obtained by high-pass filtering ("H") horizontal pixels and low-pass filtering ("L") vertical pixels in stage 3.

In the above manner, each of the three components is converted into coefficient data consisting of a plurality of sub-bands corresponding to the number of levels. If necessary, each tile of the obtained coefficient data is separately quantized by the quantizer 30, and is then subjected to entropy encoding by the entropy encoder 60.

Here, the entropy encoding is an encoding process including the steps of dividing each piece of coefficient data into bit planes, and encoding the bit data existing in each bit plane with a binary arithmetic encoder (or an MQ encoder).

To achieve reversible encoding, i.e., encoding without image deterioration due to compression in this structure, it is necessary to encode all the bit planes of each sub-band. In doing so, the lower bit planes of each sub-band can be discarded in the encoding process so as to increase the compression ratio.

The increasing of the compression ratio by discarding lower bit planes is called "truncation", which helps to obtain an optimum image quality at a predetermined compression ratio by selectively discarding bit planes of sub-bands that have less influence on the image quality of a decoded image.

A Case of Performing Wavelet Transforms on Sub-Sampled Components

In the following, a case where sub-sampled image data having color difference signals are encoded will be described.

FIG. 3 shows the pixel ratio in each input-output format in the x-direction (the horizontal direction) and the y-direction (the vertical direction). Here, it should be noted that the structure shown in FIG. 3 is designed to illustrate the pixel ratio in each of the input-output formats in the x-direction and the y-direction, and does not represent the actual minimum unit number of pixels in this conventional wavelet transform.

In FIG. 3, the components 1 and 2 in each format of 4:2:2 (the rate of the horizontal pixels H is 2, and the rate of the vertical pixels V is 1; hereinafter represented as "H2V1"), 4:2:2 (H1V2), and 4:1:1 (H1V1), have been sub-sampled in the previous process stage.

In the format of 4:2:2 (H2V1), for instance, the components have been sub-sampled in the x-direction, i.e., the data in the x-direction have been thinned and sub-sampled.

Likewise, in the format of 4:2:2 (H1V2), the data in the y-direction have been thinned, and, in the format of 4:1:1 (H1V1) the data in both x-direction and y-direction have been sub-sampled (or thinned).

FIG. 9 shows the wavelet coefficient of each component in a case where a two-dimensional discrete wavelet transform of 3 levels is performed on image data in the format of 4:2:2 (H2V1).

As shown in FIG. 9, in the case of a tile consisting of 128×128 pixels, the data region of each of the sub-sampled components 1 and 2 contains 64×128 pixels, as the x-direction thinning has been carried out.

When a two-dimensional discrete wavelet transform of 3 levels is performed on the data in this region, the resultant sub-bands have the horizontal pixels that are a half of the vertical pixels as shown in FIG. 10, and differ from the sub-bands of a component that has not been sub-sampled (see FIG. 8).

As described above, when a two-dimensional discrete wavelet transform is performed on data that have been thinned in the x-direction and/or the y-direction, the configurations of the sub-bands differ among components.

For this reason, when entropy encoding is carried out by dividing each sub-band into bit planes, there is a need to perform a control operation depending upon the existing differences, such as interpolating "0" into pixels or interpolating a value corresponding to the previous pixel for the sub-sampled bit planes into pixels. As a result, the circuit of the entropy encoder 60 becomes completed.

Furthermore, the interpolation causes an increase in the data by an amount equivalent to the interpolation, resulting in an increase in the total amount of data to be processed

SUMMARY OF THE INVENTION

A general object of the present invention is to provide image processing devices and image processing methods in which the above problems are eliminated.

A more specific object of the present invention is to provide an image processing device and an image processing method by which encoded data can easily be generated from sub-sampled image data, without a need for a complicated circuit or an increase in the data amount.

Another specific object of the present invention is to provide an image processing device and an image processing method by which image data that have been sub-sampled suitably for each purpose can be output.

Yet another specific object of the present invention is to provide an image reading device and an image reading method by which image data can be input and output, without causing an increase in the buffer size required for performing a wavelet transform.

The above objects of the present invention are achieved by an image processing device that includes a wavelet transformer that performs a horizontal and/or vertical wavelet transform on image data in one or more stages. This image processing device is characterized in that the wavelet transformer does not perform a horizontal and/or vertical wavelet transform on the image data in a predetermined stage.

With this image processing device, encoded data can be easily generated from sub-sampled image data, without a need for a complicated circuit or an increase in the data amount.

In the above image processing device, the wavelet transformer does not perform a wavelet transform in a predetermined direction in the predetermined stage, where the lines in the predetermined direction have been thinned in the image data. However, the wavelet transformer does perform a wavelet transform in every stage, where no lines have been thinned in the image data.

With this structure, encoded data can be more easily generated from sub-sampled image data.

This image processing device may further include an encoder that encodes coefficient data created by the wavelet transformer. This encoder is characterized by not encoding a predetermined sub-band, where the coefficient data do not contain the predetermined sub-band.

With this structure, encoded data with a high compression ratio can be obtained.

The above objects of the present invention are also achieved by an image processing device that includes: a two-dimensional wavelet transformer that performs a two-dimensional wavelet transform in one or more stages, and consists of a one-dimensional horizontal wavelet transformer that performs a one-dimensional wavelet transform in the horizontal direction on image data produced for each of a plurality of components, and a one-dimensional vertical wavelet transformer that performs a one-dimensional wavelet transform in the vertical direction on the image data; and an input-output switcher that switches inputs and outputs of the one-dimensional horizontal wavelet transformer and/or the one-dimensional vertical wavelet transformer in a first stage. This image processing device is characterized in that the input-output switcher switches the inputs and outputs so as not to perform a one-dimensional wavelet transform in a predetermined direction in the first stage, where the lines in the predetermined direction have been thinned in the image data.

With this image processing device, a suitable wavelet transform can be performed on sub-sampled image data, and encoded data can be easily generated without a complicated circuit or an increase in the data amount.

This image processing device may further include an input switcher that switches inputs for the latter half of the first stage. This input switcher is characterized by switching the inputs so that coefficient data generated through a two-dimensional wavelet transform performed in the first stage are input in the latter half of the first stage, where no lines have been thinned in the image data.

With this structure, sub-sampled image data can be distinguished from image data that have not been sub-sampled, so that suitable wavelet transforms can be performed on both types of image data. Thus, encoded data can be easily generated without a complicated circuit or an increase in the data amount.

The above objects of the present invention are also achieved by an image processing device that includes an inverse wavelet transformer that performs a horizontal and/or vertical inverse wavelet transform on coefficient data consisting of a plurality of sub-bands generated through a wavelet transform. This image processing device is characterized in that the inverse wavelet transformer does not perform an inverse wavelet transform on the coefficient data in a predetermined stage.

With this image processing device, image data that have been sub-sampled suitably for each purpose can be output.

In this image processing device, the inverse wavelet transformer may not perform an inverse wavelet transform on the coefficient data, depending on the configuration of image data to be produced.

With this structure, image data that have been sub-sampled and image data that have not been sub-sampled can be easily switched and then output.

The above objects of the present invention are also achieved by an image processing device that includes: a two-dimensional inverse wavelet transformer that performs a two-dimensional inverse wavelet transform in one or more stages, and consists of a one-dimensional horizontal inverse wavelet transformer that performs a one-dimensional inverse wavelet transform in the horizontal direction on coefficient data consisting of one or more sub-bands, and a one-dimensional vertical inverse wavelet transformer that performs a one-dimensional inverse wavelet transform in the vertical direction on the coefficient data; and an input-output switcher that switches inputs and outputs of the one-dimensional horizontal inverse wavelet transformer and/or the one-dimensional vertical inverse wavelet transformer in the last stage. This image processing device is characterized in that the input-output switcher switches the inputs and outputs so as not to perform a one-dimensional inverse wavelet transform in the horizontal direction and/or the vertical direction in the last stage, depending on the configuration of the image data to be produced.

With this image processing device, image data that have been sub-sampled and have been subjected to a suitable inverse wavelet transform for each purpose can be output.

This image forming apparatus may further include an input switcher that switches inputs for the latter half of the last stage. This input switcher is characterized by switching the inputs so that image data not having a two-dimensional inverse wavelet transform performed thereon in the last stage are input in the latter half of the last stage, where image data having coefficient data that have not been subjected to the two-dimensional inverse wavelet transform in the last stage are to be produced.

With this structure, whether target image data have been sub-sampled or not can be determined, and thus a suitable inverse wavelet transform can be performed on the image data.

The above objects of the present invention are also achieved by an image processing device that includes a pixel data reader that reads pixel data of each of a plurality of components from an image. This image processing device is characterized in that the pixel data reader switches objects to be input for each pixel, each tile, or each line.

With this image processing device, image data can be input or output without an increase in the buffer size required for performing a wavelet transform.

In this image processing device, the pixel data reader may read pixel data of different components one at a time, or two or more at once.

With this structure, image data can be input or output without an increase in the buffer size required for performing a wavelet transform, and pixel data of a plurality of components can be simultaneously read in.

In this image processing device, the plurality of components may consist of a first component, a second component, and a third component. Further, the pixel data reader switches the components so as to read the pixel data of the first component, the pixel data of the second component, and the pixel data of the third component at a ratio of 2:1:1, where the lines in the vertical direction are to be thinned in the image data of the second and third components.

With this structure, image data that have been suitably sub-sampled so as to prevent an increase in the buffer size required for performing a wavelet transform can be read in.

In this image processing device, the pixel data reader reads the vertical-direction pixel data of the second and third components from every other pixel, where the lines in the horizontal direction are also to be thinned in the image data of the second and third components.

With this structure, image data that have been suitably sub-sampled so as to prevent an increase in the buffer size required for performing a wavelet transform can be read in.

In this image processing device, the plurality of components may consist of a first component, a second component, and a third component. Further, the pixel data reader switches the components so as to read the pixel data of the first component and the pixel data of the second component or the third component at a ratio of 2:1, and also switches the second component and the third component for each line, where the lines in the horizontal direction are to be thinned in the image data of the second component and the third component.

With this structure, image data that have been suitably sub-sampled so as to prevent an increase in the buffer size required for performing a wavelet transform can be read in.

The above objects of the present invention are also achieved by an image processing method that includes the step of performing a wavelet transform on image data in the horizontal direction and/or the vertical direction in one or more stages. This image processing method is characterized in that the step of performing a wavelet transform is not carried out in a predetermined stage.

By this image processing method, encoded data can be easily generated from sub-sampled image data, without a complicated circuit or an increase in the data amount.

In this image processing method, the step of performing a wavelet transform does not involve a wavelet transform in a predetermined direction in the predetermined stage where the lines in the predetermined direction have been thinned in the image data, but involves a wavelet transform in every stage where no lines have been thinned in the image data.

In this manner, encoded data can be easily generated from sub-sampled image data.

This image processing method may further include the step of encoding coefficient data produced in the step of performing a wavelet transform. This step of encoding is characterized by not being performed on a predetermined sub-band, where the coefficient data do not include the predetermined sub-band.

In this manner, encoded data with a high compression ratio can be generated.

The above objects of the present invention are also achieved by an image processing method that includes the step of performing an inverse wavelet transform of the horizontal direction and/or the vertical direction on coefficient data consisting of a plurality of sub-bands generated through a wavelet transform. This image processing method is characterized in that the step of performing an inverse wavelet transform is not carried out in a predetermined stage.

By this image processing method, image data that have been sub-sampled suitably for each purpose can be output.

In this image processing method, the step of performing an inverse wavelet transform may not involve an inverse wavelet transform on the coefficient data, depending on the configuration of image data to be produced.

In this manner, image data that have been sub-sampled and image data that have not been sub-sampled can be easily switched and then output.

The above objects of the present invention are also achieved by an image reading method that includes the step of reading pixel data of each of a plurality of components from an image. This step of reading pixel data involves switching the components as input objects for each pixel, each tile, or each line.

By this image reading method, image data can be input or output in such a manner as not to increase the buffer size required for performing a wavelet transform.

In this image reading method, the step of reading pixel data may involve reading pixel data of different components one at a time, or two or more at once.

In this manner, image data can be input or output in such a manner as not to increase the buffer size required for performing a wavelet transform, and pixel data of a plurality of components can be simultaneously read in.

In this image reading method, the plurality of components may include a first component, a second component, and a third component. Further, the step of reading pixel data involves switching the components so as to read the pixel data of the first component, the pixel data of the second component, and the pixel data of the third component at a ratio of 2:1:1, where the lines in the vertical direction are to be thinned in the image data of the second component and the third component.

In this manner, image data that have been suitably sub-sampled so as not to increase the buffer size required for performing a wavelet transform can be read in.

In this image reading method, the step of reading pixel data involves reading the vertical-direction pixel data of the second component and the third component from every other pixel, where the lines in the horizontal direction are also to be thinned in the image data of the second component and the third component.

In this manner, image data that have been suitably sub-sampled so as not to increase the buffer size required for performing a wavelet transform can be read in.

In this image reading method, the plurality of components may include a first component, a second component, and a third component. Further, the step of reading pixel data involves switching the components so as to read the pixel data of the first component and the pixel data of the second component or the third component at a ratio of 2:1, and also involves switching the second component and the third component for each line, where the lines in the horizontal direction are to be thinned in the image data of the second component and the third component.

In this manner, image data that have been suitably sub-sampled so as not to increase the buffer size required for performing a wavelet transform can be read in.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

The present invention is to increase the compression effects in an image compression process in accordance with the JPEG-2000.

To achieve this, "0" bits interpolated into image data that have been thinned in accordance with the prior art are put together to form a so-called "0"-bit plane. This "0"-bit plane is made up of values "0".

More specifically, in a case where a two-dimensional discrete wavelet transform in accordance with the JPEG-2000 is to be performed on image data consisting of a component 0 representing Y, a component 1 representing Cb, and a component 2 representing Cr, having each tile consisting of 128×128 pixels, and having the y-direction pixels in each of the components 1 and 2 thinned to form image data consisting of 64×128 pixels, the prior art requires the interpolation of "0" into the pixels in the components 1 and 2, so that all the components have the same size of 128×128 pixels.

To eliminate this interpolation process, the "0"-bit planes are added to the components 1 and 2 in the present invention, so that all the components have the same size of 128×128 pixels.

In accordance with the JPEG-2000, each of the "0"-bit planes is compressed to 1-bit data. Thus, the present invention is to achieve a high compression ratio with the addition of the "0"-bit planes instead of the interpolation.

However, the present invention specifies the region of the "0"-bit plane for each data format. Therefore, the process of adding the "0"-bit planes is omitted in practice, and the operation is performed on the assumption that the "0"-bit plane has been formed on each predetermined bit plane.

First Embodiment

In the following, a first preferred embodiment of the present invention will be described, with reference to the drawings.

(Structure of the First Embodiment)

Figure 1:
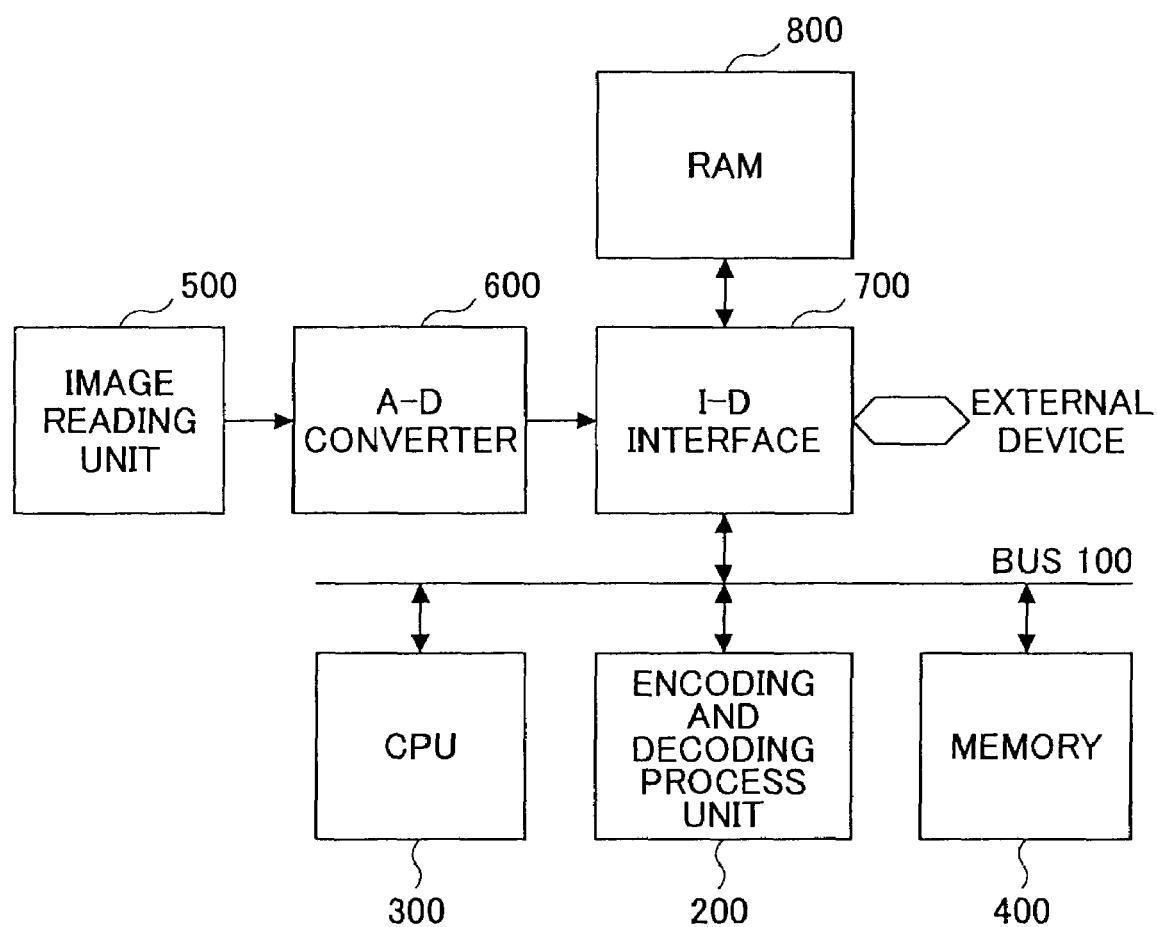
FIG. 1 is a block diagram showing an example of the structure of an image processing device in accordance with a first embodiment of the present invention.

This embodiment is to increase the compression ratio in accordance with the JPEG-2000 in an image processing device shown in FIG. 1.

Figure 2:
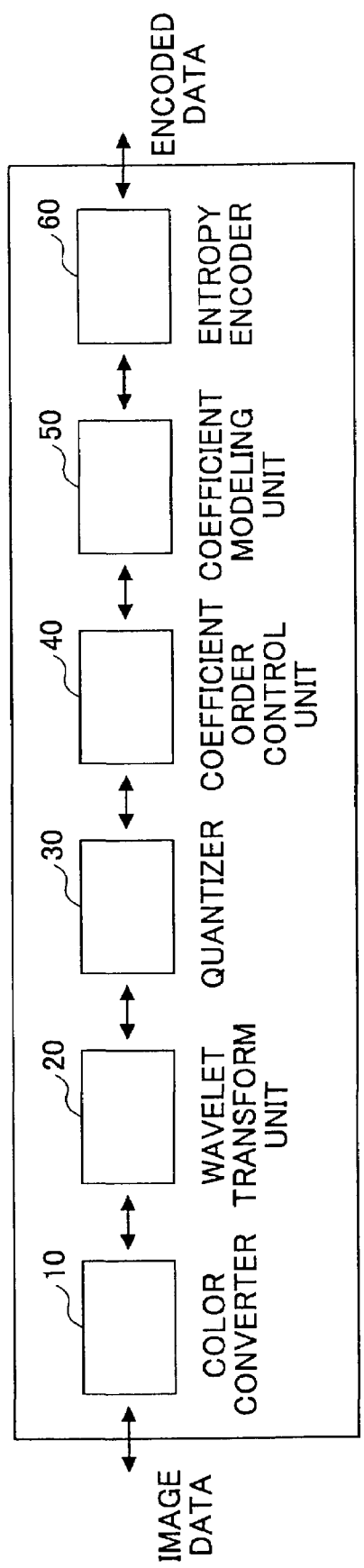
FIG. 2 is a block diagram showing an example of the structure of the encoding function block in the encoding and decoding process unit 200 in accordance with the first embodiment of the present invention.
Figure 3:
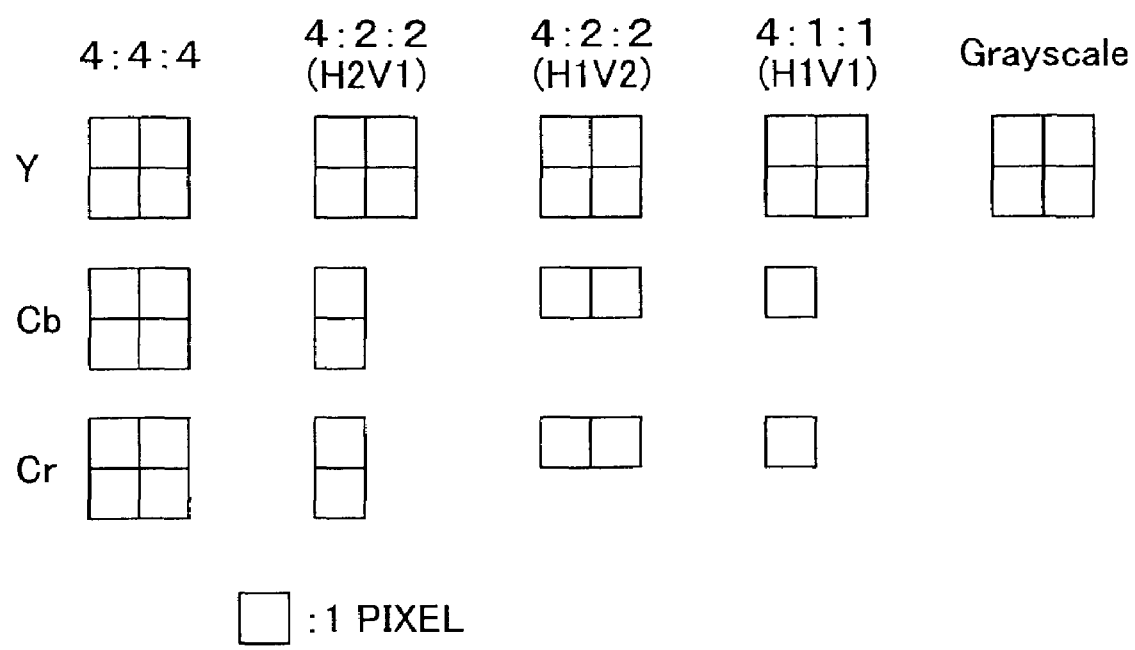
FIG. 3 shows examples of pixel ratios in the input-output formats of 4:4:4, 4:2:2 (H2V1), 4:2:2 (H1V2), 4:1:1, and grayscale, in the x-direction and the y-direction.
Figure 4:
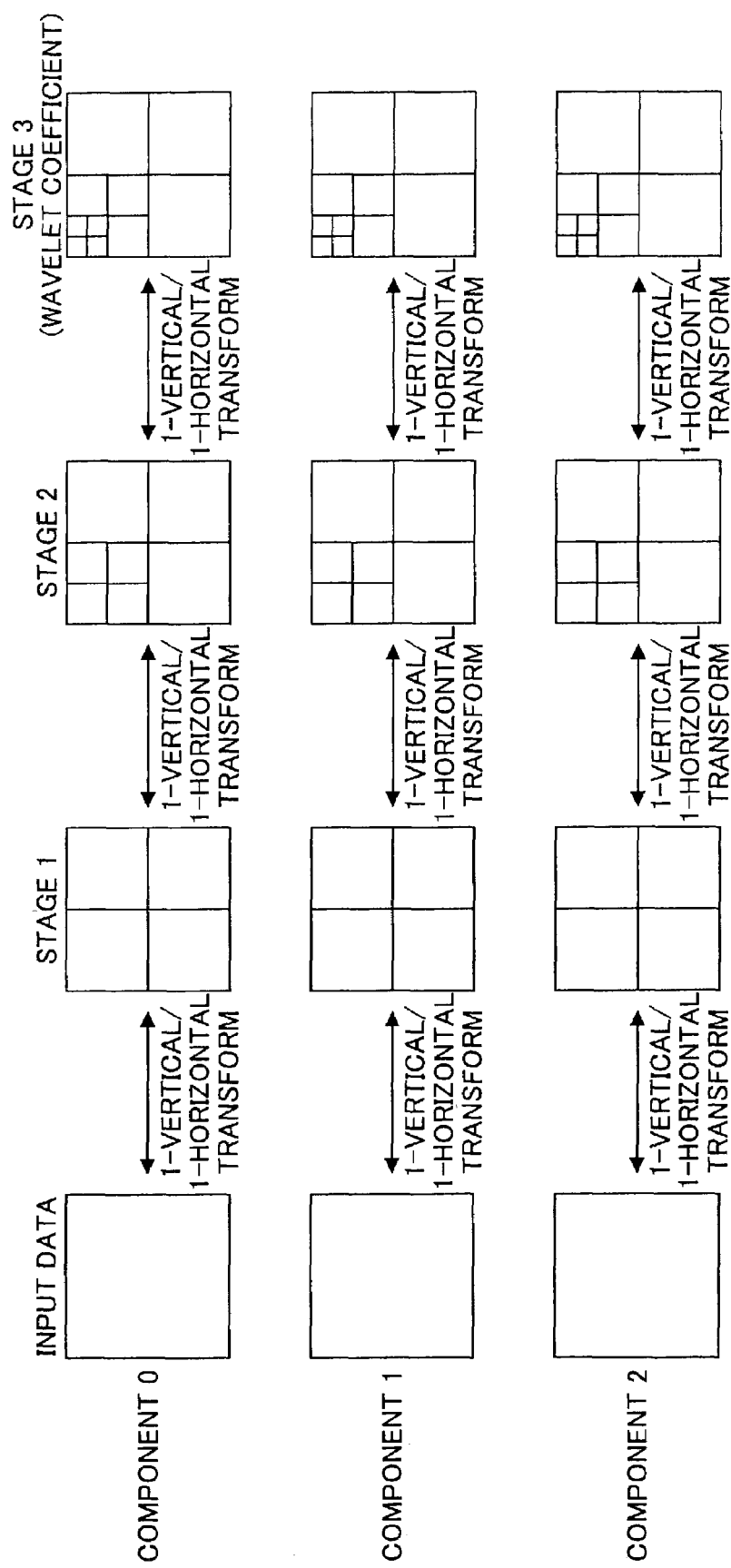
FIG. 4 shows each stage of a two-dimensional discrete wavelet transform to be performed on image data in the 4:4:4 format.

In FIG. 1, an encoding and decoding process unit 200 has such a function block as shown in FIG. 2. The encoding and decoding process unit 200 encodes input image data by performing operations such as color conversion, wavelet transforms, quantization, coefficient order control, coefficient modeling, and entropy encoding. The encoding and decoding process unit 200 also decodes input encoded data by performing the reverse operations of the above encoding operations.

An image reading unit 500 is formed by a device such as a CCD camera. An analog-to-digital (A-D) converter 600 converts image data read by the image reading unit 500 into digital data, and then outputs it.

An input-output interface 700 interfaces the data transmission and reception among the A-D converter 600, a RAM 800, and a bus 100, or between external devices.

A CPU 300 performs a control operation for each part, and a memory 400 functions as a work area for the CPU 300 and the encoding and decoding process unit 200.

In this structure, the encoding and decoding process unit 200 operates in the following manner.

(Encoding)

First, the encoding performed by the encoding and decoding process unit 200 will be described with reference to the drawings. In the following description, each tile is formed by 128×128 pixels. Also, the structure of the encoding block of JPEG-2000 in the encoding and decoding process unit 200 is the same as the structure shown in FIG. 2. However, the wavelet transform unit 20 of this embodiment has a different structure and performs a different operation from the structure and operation described in relation to the prior art.

In the following description, the image data will be shown in a 4:4:4 format, a 4:2:2 (H2V1) format, a 4:2:2 (H1V2) format, and a 4:1:1 (4:2:0) format, for ease of explanation.

The 4:4:4 format represents RGB or YCbCr image data having a pixel number ratio of 4:4:4 (i.e., 1:1:1) among the components (in terms of Y:Cb:Cr, for example). In other words, the image data in the 4:4:4 format are data that have not been thinned.

The 4:2:2 (H2V1) format represents image data having a pixel number ratio of 4:2:2 among the components, i.e., image data having the vertical direction (y-direction) pixels thinned. The 4:2:2 (H1V2) format represents image data having a pixel number ratio of 4:2:2 among the components, i.e., image data having the horizontal direction (x-direction) pixels thinned.

The 4:1:1 (H1V1) format represents image data having a pixel number ratio of 4:1:1 among the components, i.e., image data having the vertical and horizontal direction pixels thinned.

In this embodiment, image data to be input into the wavelet transform unit 20 are in the form of YCbCr, and a wavelet transform to be performed consists of three levels.

A Case of Encoding Image Data Sub-Sampled into the 4:2:2 (H2V1) Format

First, the encoding of image data that have been sub-sampled into the 4:2:2 (H2V1) format in accordance with this embodiment will be described.

Figure 5:
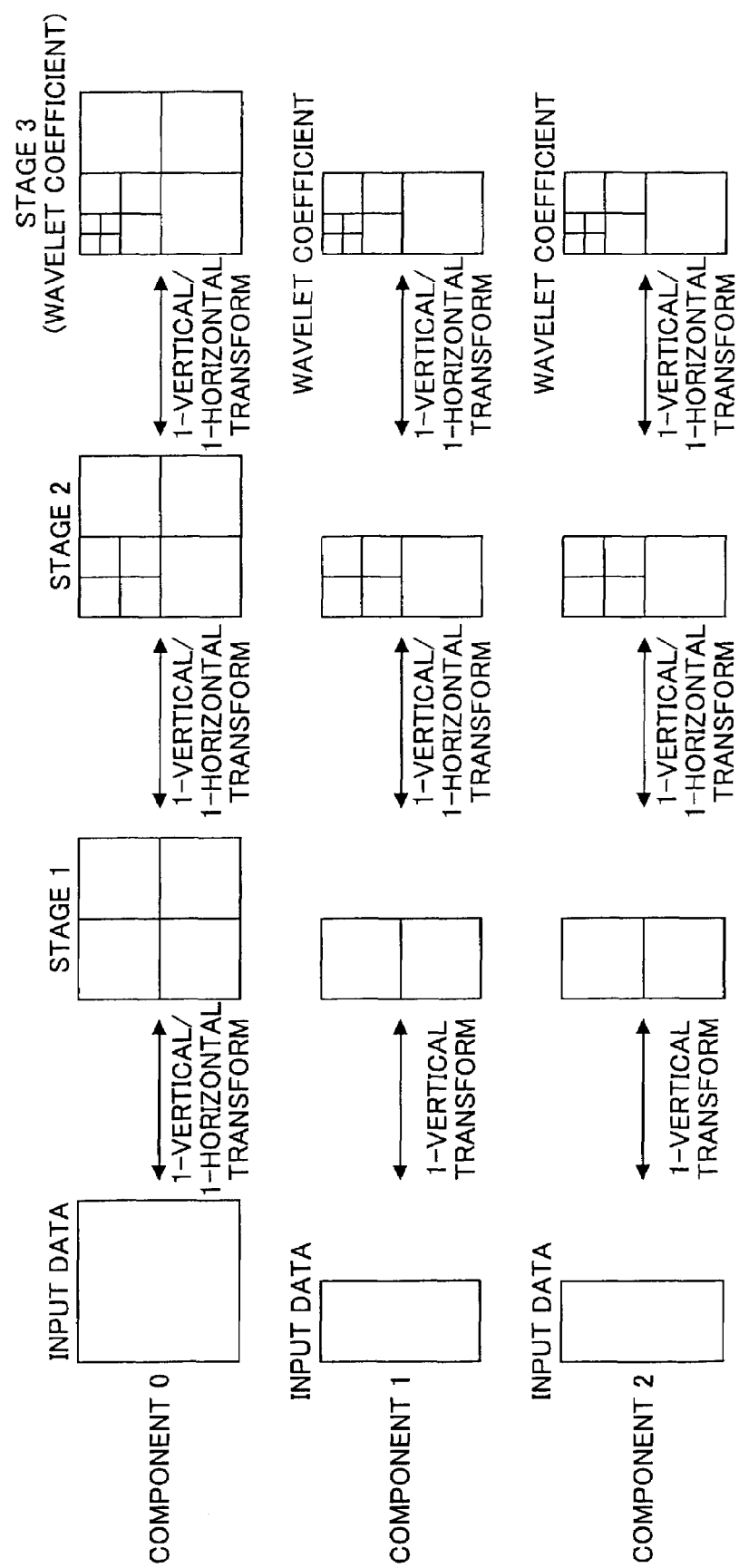
FIG. 5 shows each stage of a two-dimensional discrete wavelet transform to be performed on image data in the 4:2:2 (H2V1) format.

FIG. 5 shows each stage of a wavelet transform to be performed on image data in the 4:2:2 (H2V1) format.

As can be seen from FIG. 5, the components 1 and 2 of the image data in the 4:2:2 (H2V1) format each has input data consisting of 64×128 pixels, having been sub-sampled (thinned) in the x-direction. Likewise, the output data of the components 1 and 2 each consist of 64×128 pixels.

In this embodiment, when the image data consisting of 64×128 pixels are input, the wavelet transform unit 20 determines that the data of the components 1 and 2 that have already been low-pass filtered in the x-direction are input. Therefore, only a vertical transform is performed in the stage 1 in FIG. 5. In each of the following stages 2 and 3, a vertical transform and a horizontal transform are performed one time each.

Figure 11:
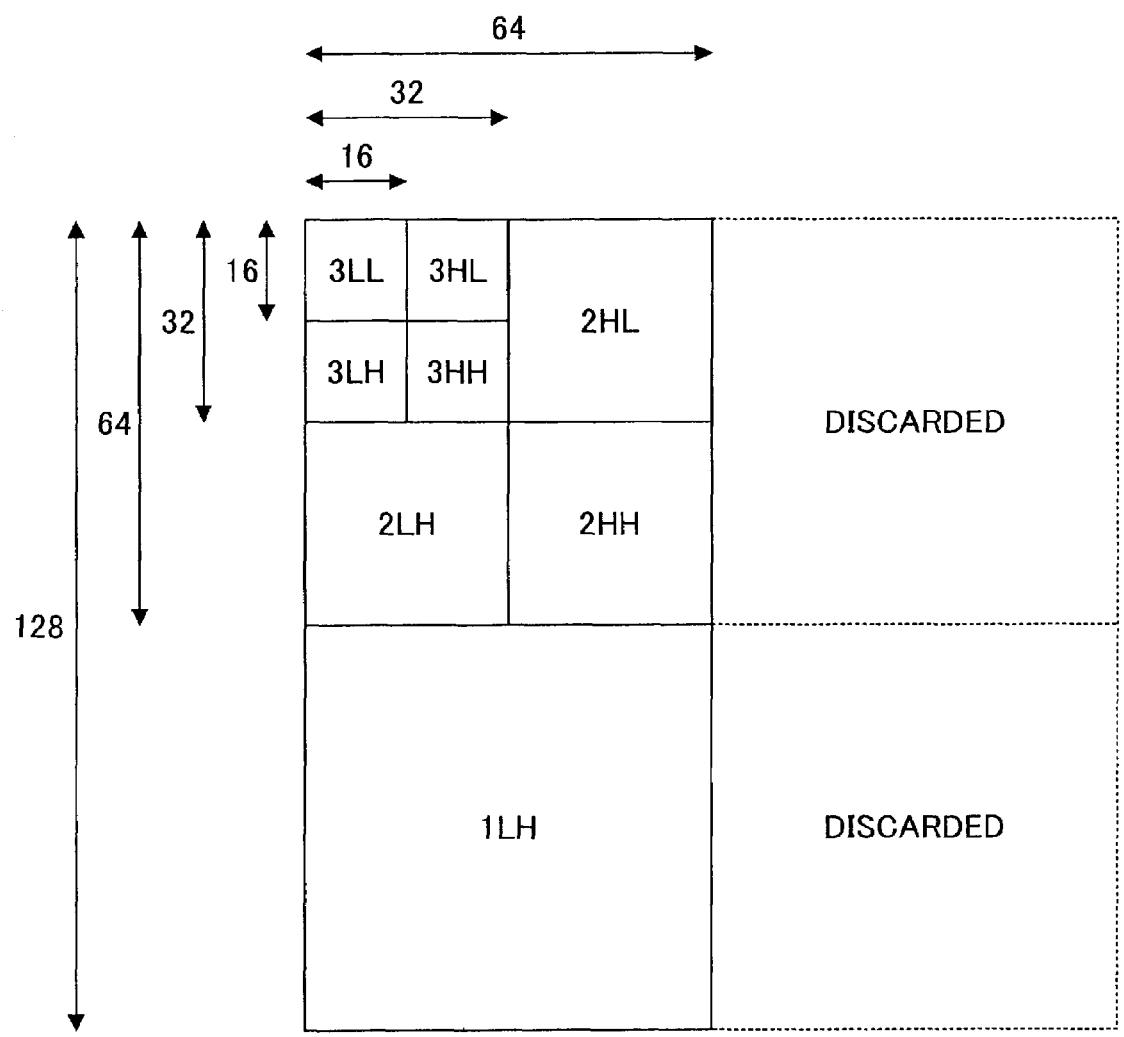
FIG. 11 illustrates an example of the configurations of sub-bands generated through the two-dimensional discrete wavelet transform shown in FIG. 5.

Through the above process, the resultant coefficient data of the components 1 and 2 consist of 3LL through 2HH and 1LH, and the resultant sub-bands have the form shown in FIG. 11.

Here, the sizes of the sub-bands need to be the same among all the components. Therefore, the sub-bands of the components 1 and 2 continue to be processed on the assumption that they contain the coefficient data of 1HL and 1HH.

More specifically, when the coefficient data shown in FIG. 11 are subjected to entropy encoding, the entropy encoder 60 performs the entropy encoding on the assumption that the coefficient data of the sub-bands of 1HL and 1HH, which are supposed to exist, have been discarded (truncated). Thus, codes that conform to the JPEG-200 can be generated.

By the above method, the size of each sub-band region can be considered to be the same among all the components, and therefore the same encoding control can be performed for all the components. Accordingly, there is no need to employ a completed circuit to generate codes that conform to the JPEG-2000.

A Case of Encoding Image Data Sub-Sampled into the 4:2:2 (H1V2) Format

Next, the encoding of the image data that have been sub-sampled into the 4:2:2 (H1V2) format in accordance with this embodiment will be described.

Figure 6:
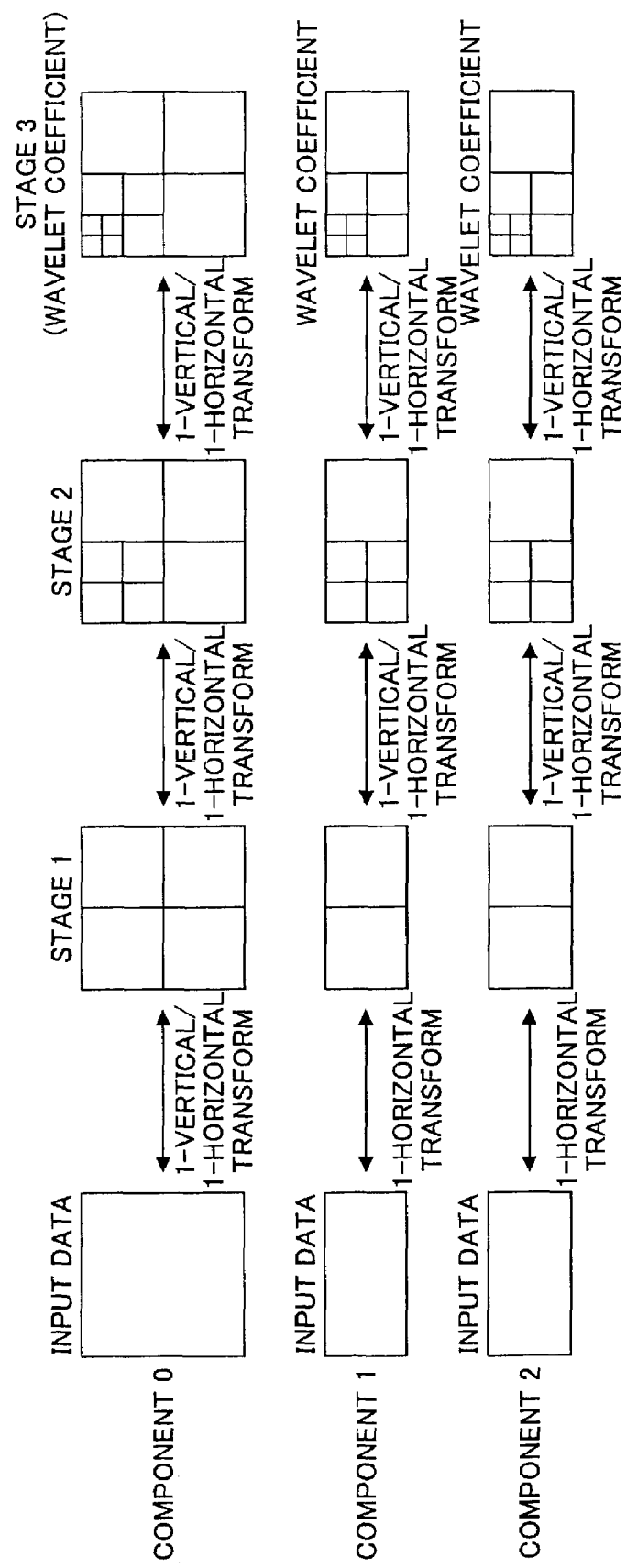
FIG. 6 shows each stage of a two-dimensional discrete wavelet transform to be performed on image data in the 4:2:2 (H1V2) format.

FIG. 6 shows each stage of a wavelet transform to be performed on image data in the 4:2:2 (H1V2) format.

As can be seen from FIG. 6, the components 1 and 2 each has input data consisting of 128×64 pixels, having been sub-sampled in the y-direction. Likewise, the output data of each of the components 1 and 2 consist of 128×64 pixels.

In this embodiment, when the image data consisting of 128×64 pixels are input, the wavelet transform unit 20 determines that the data of the components 1 and 2 that have already been low-pass filtered in the y-direction are input. Accordingly, only a horizontal transform is performed in the stage 1 shown in FIG. 6. In each of the stages 2 and 3 that follow the stage 1, a vertical transform and a horizontal transform are performed one time each.

Through the above process, the resultant coefficient data of the components 1 and 2 consist of 3LL through 2HH and 1HL, and the sub-bands include 1HL instead of 1LH of the structure shown in FIG. 11.

In the process that follows the above process, the "0"-bit planes of 1LH and 1HH are supposed to exist in the sub-bands of the components 1 and 2, and the coefficient data of 1LH and 1HH are discarded to perform entropy encoding. Thus, codes that conform to the JPEG-2000 are generated.

In this case, the size of each sub-band region can also be considered to be the same among all the components, and therefore the same encoding control can be performed for all the components. Thus, codes that conform to the JPEG-2000 can be generated, without the addition of a completed circuit.

A Case of Encoding the Image Data Sub-Sampled into the 4:1:1 (H1V1) Format

The encoding of the image data that have been sub-sampled into the 4:1:1 (H1V1) format will now be described below.

Figure 7:
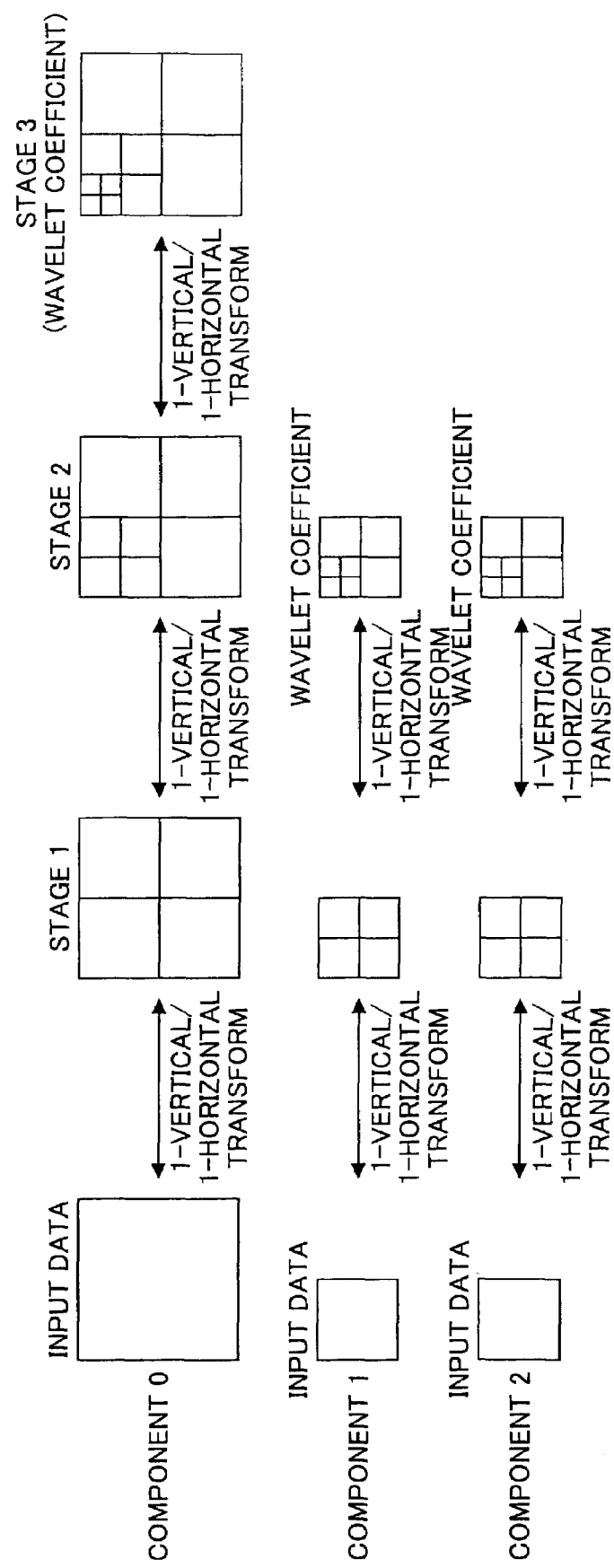
FIG. 7 shows each stage of a two-dimensional discrete wavelet transform to be performed on image data in the 4:1:1 format.
Figure 8:
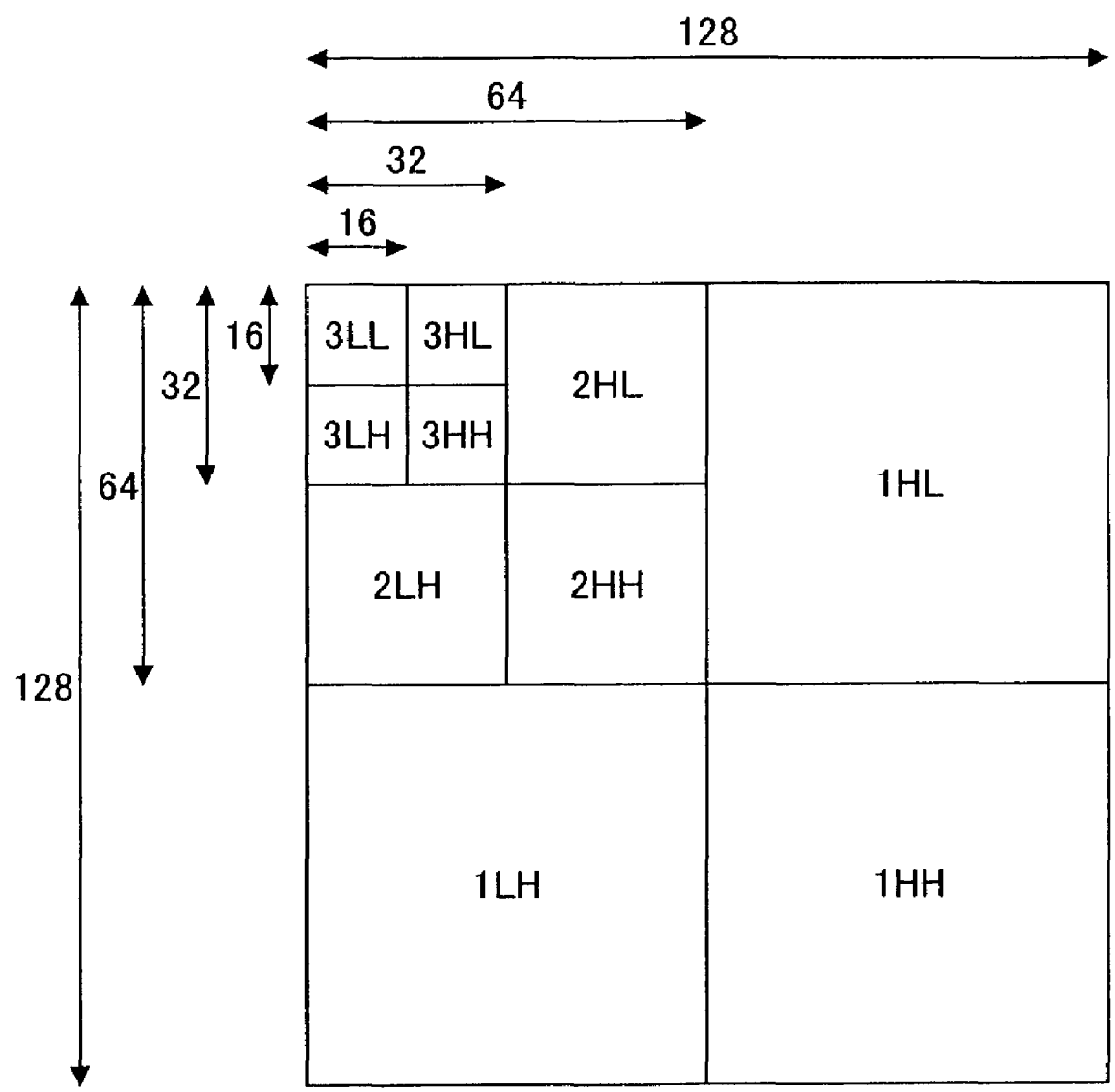
FIG. 8 illustrates an example of the configuration of sub-bands generated through a two-dimensional discrete wavelet transform of three levels performed on a component that has not been sub-sampled.
Figure 9:
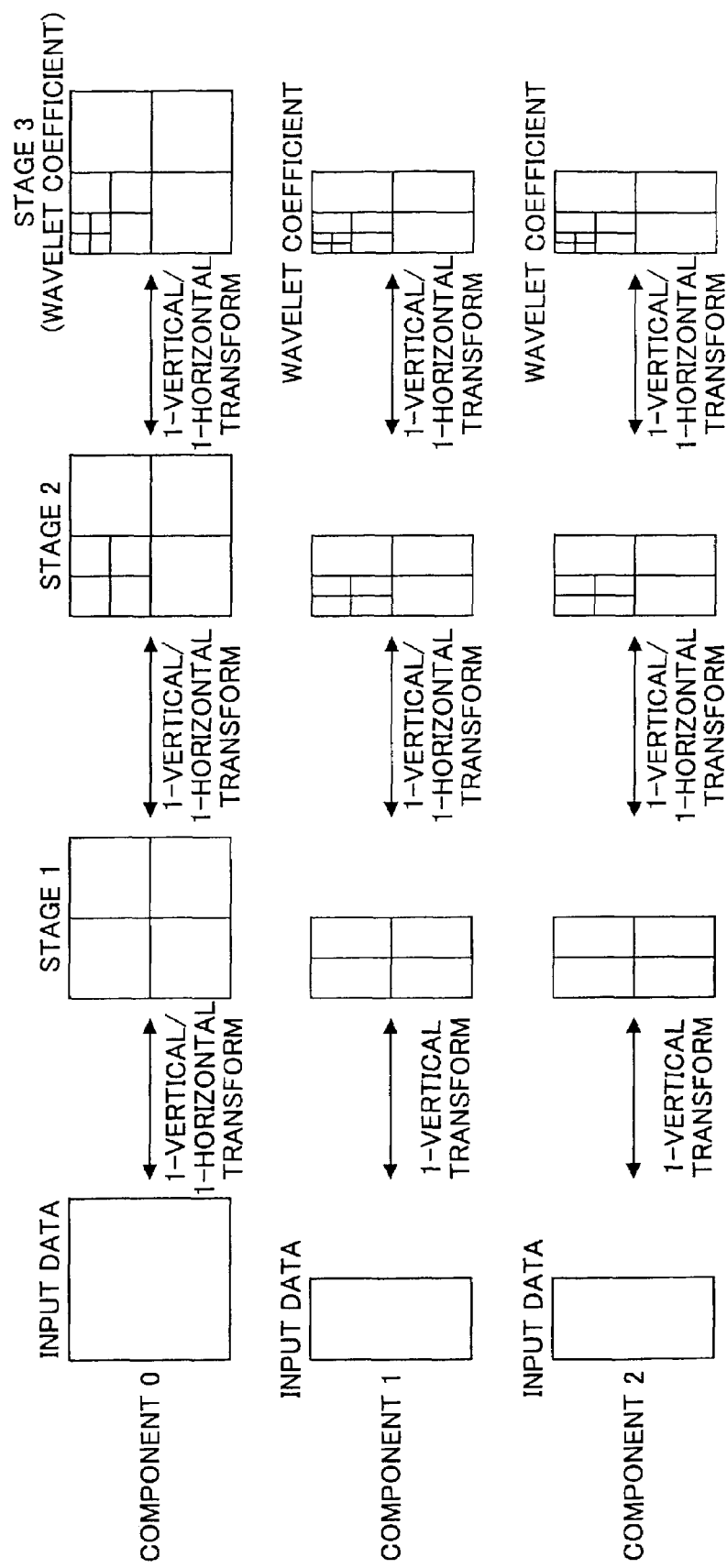
FIG. 9 shows each stage of a two-dimensional discrete wavelet transform to be performed on image data in the 4:2:2 (H2V1) format in accordance with the prior art.
Figure 10:
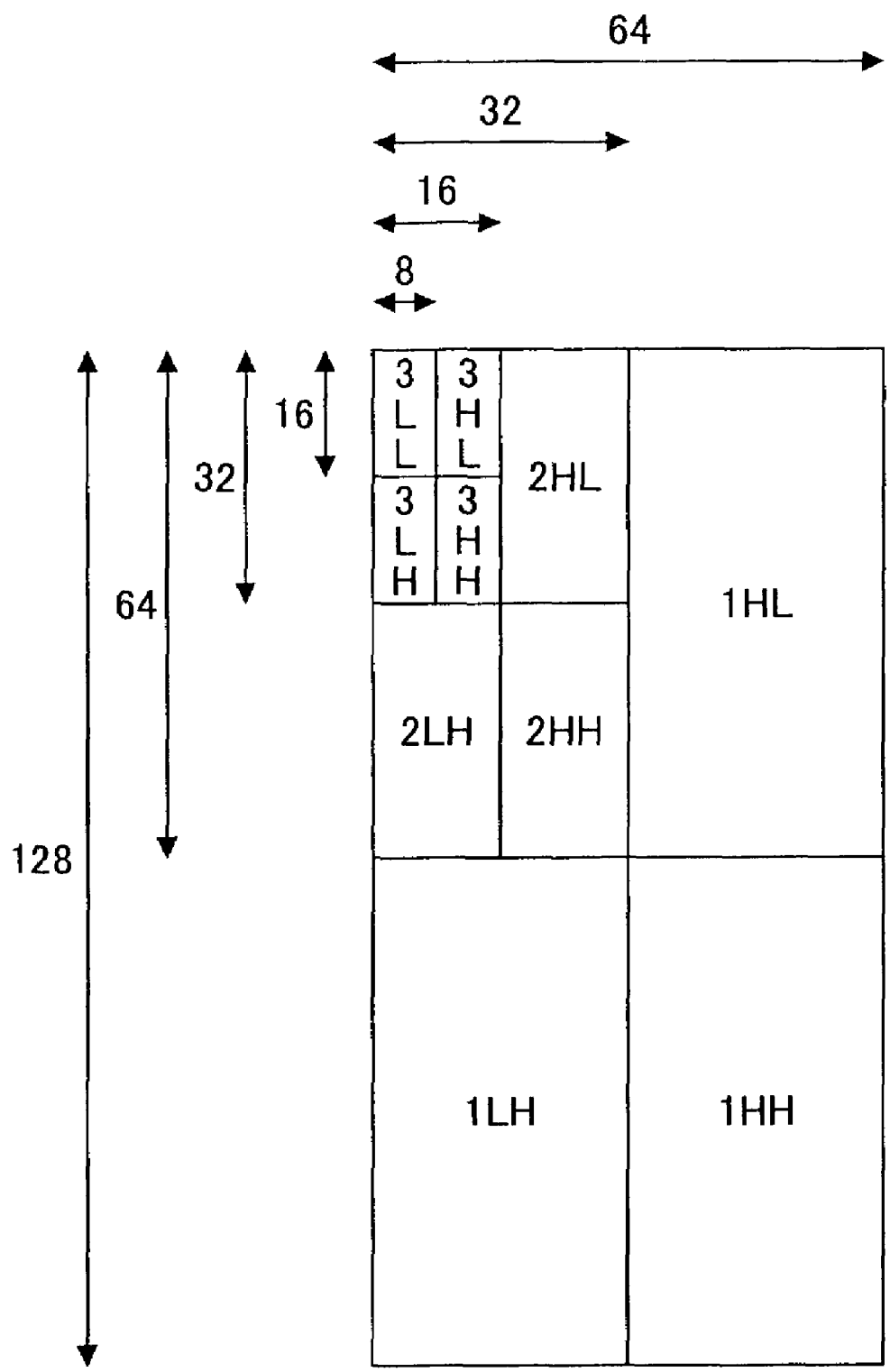
FIG. 10 illustrates an example of the configuration of sub-bands generated through the two-dimensional discrete wavelet transform shown in FIG. 9.

FIG. 7 shows each stage of a wavelet transform to be performed on image data in the 4:1:1 (H1V1) format.

As can be seen from FIG. 7, the components 1 and 2 each has input data consisting of 64×64 pixels, having been sub-sampled (or thinned) both in the x-direction and the y-direction. Likewise, the output data of each of the components 1 and 2 consist of 64×64 pixels.

In this embodiment, when the image data consisting of 64×64 pixels are input, the wavelet transform unit 20 determines that the data of the components 1 and 2 that have already been low-pass filtered in the x-direction and the y-direction are input, or that the data of 1LL are simply input. Accordingly, in each the stages 1 and 2, a vertical transform and a horizontal transform are performed one time each, and a third transform, i.e., the stage 3, is omitted.

Through the above process, the resultant coefficient data of the components 1 and 2 are 3LL through 2HH.

In the process that follows the above process, the "0"-bit planes of 1HL, 1LH, and 1HH are supposed to exist in the sub-bands of the components 1 and 2, and the coefficient data of 1HL, 1LH, and 1HH are discarded to perform entropy encoding. Thus, codes that conform to the JPEG-2000 are generated.

In this case, the size of each sub-band region can also be considered to be the same among all the components, and therefore the same encoding control can be performed for all the components. Thus, codes that conform to the JPEG-2000 can be generated, without the addition of a completed circuit.

Since the sub-bands of all the components can be considered to have the same configurations as described above, codes that conform to the JPEG-2000 can be obtained through the same entropy encoding, regardless of the varied input formats.

When YCbCr image data having color difference data sub-sampled, for example, are input in a device that performs image encoding in accordance with the JPEG-2000, only the degrees of the wavelet transforms for the sub-sampled Cb and Cr should be changed so as to generate codes that conform to the JPEG-2000.

(Structure for Performing Wavelet Transforms)

Figure 12:
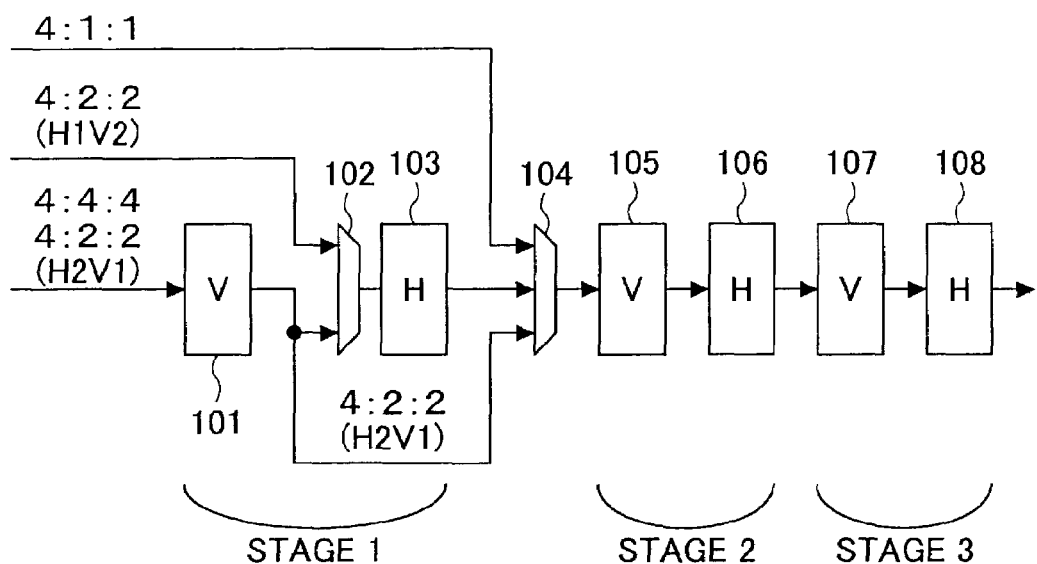
FIG. 12 is a block diagram showing an example of the structure of the wavelet transform unit 20 that performs wavelet transforms in accordance with the first embodiment of the present invention.

Referring now to the block diagram shown in FIG. 12, the structure for performing a wavelet transform to achieve the above described encoding is shown.

FIG. 12 is the block diagram showing an example of the structure of the wavelet transform unit 20 that performs a two-dimensional discrete wavelet transform. In FIG. 12, each "H" represents a block that performs a one-dimensional discrete wavelet transform in the x-direction, and each "V" represents a block that performs a one-dimensional discrete wavelet transform in the y-direction. Hereinafter, each "H" block may be referred to as a "one-dimensional horizontal discrete wavelet transform unit", and each "V" block may be referred to as a "one-dimensional vertical discrete wavelet transform unit". In the structure shown in FIG. 12, three "H" blocks and three "V" blocks are employed to be able to perform a two-dimensional discrete wavelet transform of three levels.

In each stage, the structure of the "H" blocks can be swapped with the structure of the "V" blocks. Also, control signals transmitted from a predetermined control unit (the CPU 300, for example) are input into each selector shown in FIG. 12, and each selector selects one of the inputs to be output.

A Case where Image Data in the 4:4:4 Format are Input

When image data in the 4:4:4 format are input in this structure, the "V" block 101 performs a y-direction one-dimensional discrete wavelet transform on the image data. The data output from the "V" block 101 are input into the "H" block 103 via the selector 102. The "H" block 103 then performs an x-direction one-dimensional discrete wavelet transform on the input data, thereby completing the process of the stage 1.

The data output from the "H" block 103 are input into the "V" block 105 via the selector 104, and the "V" block 105 and the "H" block 106 carry out the process of the stage 2. Likewise, the "V" block 107 and the "H" block 108 carry out the process of the stage 3.

In this manner, when image data in the 4:4:4 format are input, all the three pairs of "H" and "V" blocks are used for each of the components of the input image data so as to obtain the ultimate coefficient data.

A Case where Image Data in the 4:2:2 (H2V1) Format are Input

In a case where image data in the 4:2:2 (H2V1) format are input, all the three pairs of "H" and "V" blocks are used for the component 0 so as to obtain the ultimate coefficient data in the same manner as in the above described case of the 4:4:4 format.

As for the components 1 and 2, the "V" block 101 performs a y-direction one-dimensional discrete wavelet transform on the input image data, and the resultant data are input into the "V" block 105 via the selector 104.

More specifically, when image data in the 4:2:2 (H2V1) format are input, the selector 104 operates so as to output the data input from the "V" block 101.

In this manner, only a y-direction one-dimensional discrete wavelet transform is performed for each of the components 1 and 2 in the stage 1, while an x-direction one-dimensional discrete wavelet transform is skipped. The processes of the stages 2 and 3 are carried out in the same manner as in the case of the 4:4:4 format.

Accordingly, in a case where image data in the 4:2:2 (H2V1) format are input, all the three pairs of the "H" and "V" blocks are used for the component 0 of the input image data, and the "H" and "V" blocks other than the "H" block of the stage 1 are used for the components 1 and 2 so as to obtain the ultimate coefficient data.

A Case where Image Data in the 4:2:2 (H1V2) Format are Input

In a case where image data in the 4:2:2 (H1V2) format are input, all the three pairs of the "H" and "V" blocks are used for the component 0 so as to obtain the ultimate coefficient data in the same manner as in the case of the 4:4:4 format.

As for the components 1 and 2, the image data are input into the "H" block 103 via the selector 102, so that an x-direction one-dimensional discrete wavelet transform is performed.

More specifically, when image data in the 4:2:2 (H1V2) format are input, the image data are input directly to the selector 102 instead of the "V" block 101, and the selector 102 then outputs the image data to the "H" block 103.

In doing so, only an x-direction one-dimensional discrete wavelet transform is performed for each of the components 1 and 2 in the stage 1, while a y-direction one-direction discrete wavelet transform is skipped. The processes of the stages 2 and 3 are carried out in the same manner as in the case of the 4:4:4 format.

Accordingly, in a case where image data in the 4:2:2 (H1V2) format are input in this embodiment, all the three pairs of the "H" and "V" blocks are used for the component 0 of the input image data, and the "H" and "V" blocks other than the "V" block of the stage 1 are used for the components 1 and 2 so as to obtain the ultimate coefficient data.

A Case where Image Data in the 4:1:1 (H1V1) Format are Input

In a case where image data in the 4:1:1 (H1V1) format are input, all the three pairs of "H" and "V" blocks are used for the component 0 so as to obtain the ultimate coefficient data.

As for the components 1 and 2, the image data are not input to the "V" block 101 and the "H" block 103, but are input to the "H" block 105 via the selector 104, so that the processes of the stage 2 and later are carried out.

More specifically, in a case where image data in the 4:1:1 (H1V1) format are input, the image data are input directly to the selector 104, which then outputs the image data to the "V" block 105.

In doing so, the processes of the stage 1 for the components 1 and 2 are skipped, and the processes of the stages 2 and 3 are carried out in the same manner as in the case of the 4:4:4 format.

Accordingly, in a case where image data in the 4:1:1 (H1V1) format are input in this embodiment, all the three pairs of "H" and "V" blocks are used for the component 0 of the input image data, and only the "H" and "V" blocks of the stage 2 and later are used for the components 1 and 2 so as to obtain the ultimate coefficient data.

In the above described manner, a simple switching function for wavelet transforms is added before the "H" block of the stage 1, so that a two-dimensional discrete wavelet transform that is suitable for any of the formats can be achieved regardless of whether or not the image data have been sub-sampled.

In a device that performs image encoding in accordance with the JPEG-2000, the degree of wavelet transforms to be performed for image data such as YCbCr data that have color difference data sub-sampled, and image data such as YCbCr or RGB data that have not been sub-sampled, should be changed, so that codes that conform to the JPEG-2000 can be generated collectively for both types of image data.

(Structure for Performing Inverse Wavelet Transforms)

Referring now to the block diagram of FIG. 13, a structure for performing inverse wavelet transforms in accordance with this embodiment will be described below in detail.

Figure 13:
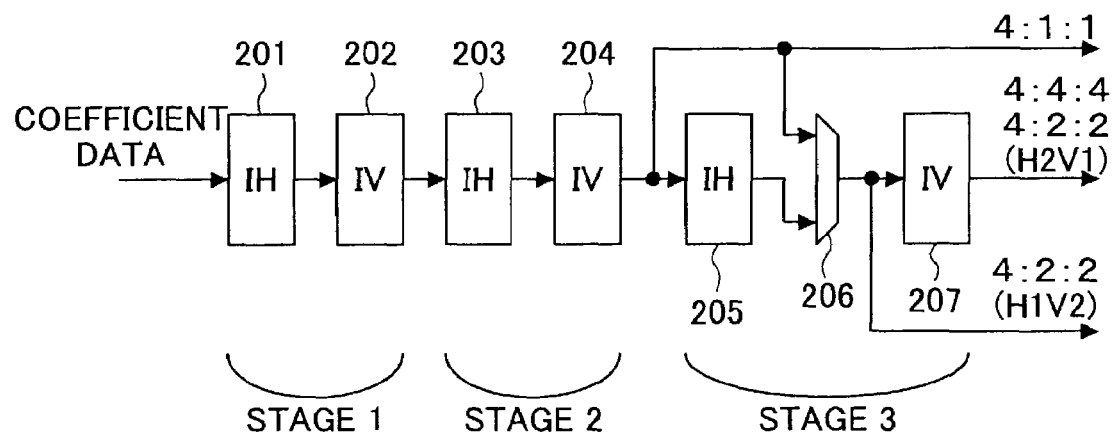
FIG. 13 is a block diagram showing an example of the structure of the wavelet transform unit 20 that performs inverse wavelet transforms in accordance with the first embodiment of the present invention.

FIG. 13 is a block diagram showing an example of the structure of the wavelet transform unit 20 that performs two-dimensional discrete inverse wavelet transform. In FIG. 13, each "IH" represents a block that performs a one-dimensional discrete inverse wavelet transform in the x-direction, and each "IV" represents a block that performs a one-dimensional discrete inverse wavelet transform in the y-direction. Hereinafter, each "IH" block may be referred to as a "one-dimensional horizontal discrete inverse wavelet transform unit", and each "IV" block may be referred to as a "one-dimensional vertical discrete inverse wavelet transform unit". In the structure shown in FIG. 13, three pairs of "IH" and "IV" blocks are employed so as to achieve a two-dimensional discrete inverse wavelet transform of three levels.

In each stage, the structures of the "IV" block and the "IH" block can be swapped with each other. In FIG. 13, control signals are input from a predetermined control unit (the CPU 300, for example) into each selector that determines which one of the inputs is to be output.

In this structure, wavelet coefficient data obtained from codes that conform to the JPEG-2000 are input.

A Case of Outputting Image Data in the 4:4:4 Format

When image data in the 4:4:4 format are to be output at the end, all the three pairs of the "IH" and "IV" blocks are used to perform a two-dimensional discrete inverse wavelet transform.

More specifically, the selector 206 selects coefficient data output from the "IH" block 205, and then inputs the coefficient data into the "IV" block 207. By doing so, image data that have passed through all the "IH" and "IV" blocks and have been finally output from the "IV" block 207 are obtained on the output end.

A Case of Outputting Image Data in the 4:2:2 (H2V1) Format

When image data in the 4:2:2 (H2V1) format are to be output, the selector 206 selects coefficient data output from the "IV" block 204, and outputs the coefficient data to the "IV" block 207. By doing so, the process to be performed at the "IH" block 205 is skipped, i e., the one-dimensional discrete inverse wavelet transform in the x-direction is skipped in the stage 3. Thus, image data that have not been subjected to the x-direction one-dimensional discrete inverse wavelet transform are obtained on the output end.

A Case of Outputting Image Data in the 4:2:2 (H1V2) Format

When image data in the 4:2:2 (H1V2) format are output, the selector 206 outputs data received from the "IH" block 205, and the data output from the selector 206 are received on the output end. In this manner, the process to be performed at the "IV" block 207 is skipped, i.e., the one-dimensional discrete inverse wavelet transform in the y-direction is skipped in the stage 3. Thus, image data that have not been subjected to the y-direction one-dimensional discrete inverse wavelet transform of the stage 3 are obtained on the output end.

A Case of Outputting Image Data in the 4:1:1 (H1V1) Format

When image data in the 4:1:1 (H1V1) format are to be output, data output from the "IV" block 204 are received on the output end. In this manner, the processes to be performed at the "IH" block 205 and the "IV" block 207 are skipped, i.e., the two-dimensional discrete inverse wavelet transform in the x-direction and the y-direction are skipped in the stage 3. Thus, image data that have not been subjected to the x-direction and y-direction two-dimensional discrete inverse wavelet transform of the stage 3 are obtained on the output end.

As described above, a switcher is provided before the "IV" block in the stage 3, so that transforms can be switched in the stage 3 depending on the format of image data to be obtained. In this manner, a two-dimensional discrete inverse wavelet transform that is suitable for any of the formats is achieved, and it is possible to switch from the output of image data such as YCbCr having color difference data sub-sample to the output of image data that have not been sub-sampled, and vice versa.

(Image Data Input and Output Method)

An image data input and output method suitable for inputting image data into an encoding function block having the structure shown in FIG. 2 will now be described in detail, with reference to the drawings. This image data input and output method is applied to the image reading unit 500.

In a system such as the NTSC system, components are normally switched for each pixel so as to input and output YCbCr signals in sequence. In some other device such as a digital camera, on the other hand, the component order is changed for each frame so as to input and output YCbCr signals.

However, if the component order is changed for each frame so as to input and output YCbCr signals for the encoder function block shown in FIG. 2, the required size for a buffer that temporarily stores image data becomes very large, resulting in a great increase in the chip size of the LSI that carries the buffer.

In this embodiment, to perform a wavelet transform on input image data, the image data are input and output to the encoder function block in the following manner (an image data input and output method).

Figure 14:
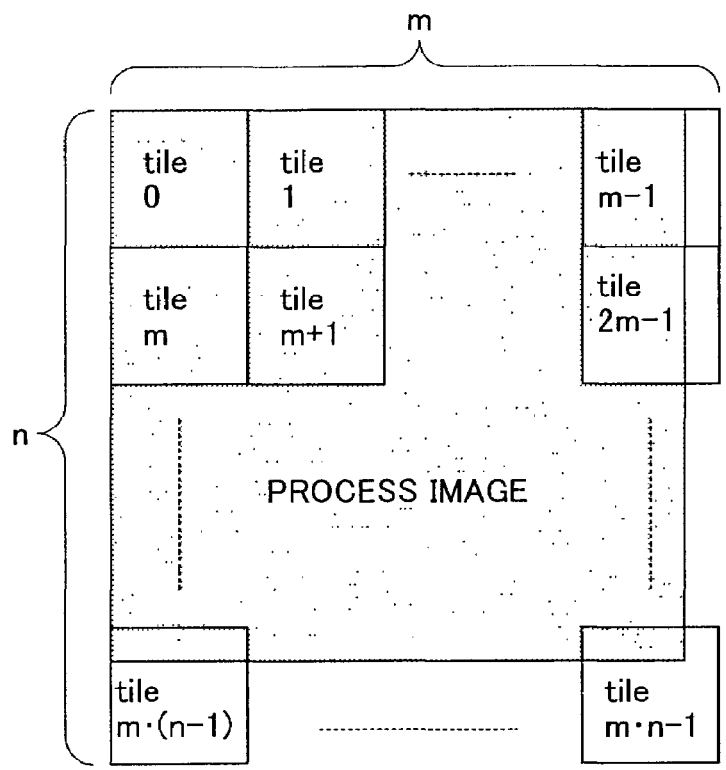
FIG. 14 is a block diagram showing the structures of tiles created by dividing image data by an image data input-output method in accordance with the first embodiment of the present invention.

In the image data input and output method of this embodiment, image data are first divided into image units (i.e., tiles), as shown in FIG. 14. After that, the tiles obtained by dividing the image data are input one by one, and are then output to the encoding function block shown in FIG. 2.

Figure 15:
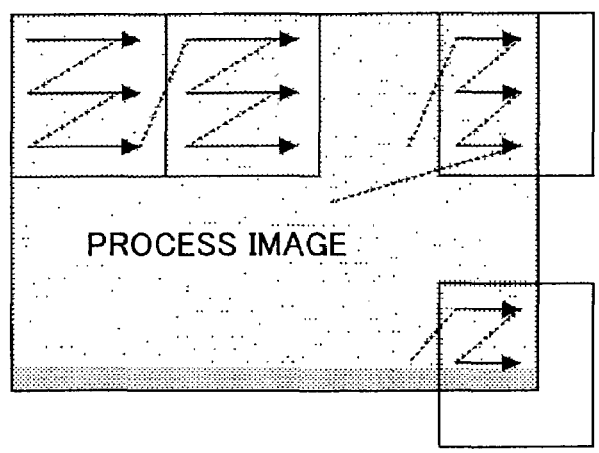
FIG. 15 illustrates the pixel data reading order in each of the tiles shown in FIG. 14.

In each tile, image data are input in the raster scan order starting from the upper left point as the starting point and ending at the lower right point as the ending point, as shown in FIG. 15. The image data input in this manner are then output.

Here, the formats of image data to be input and output in accordance with this embodiment are shown in TABLE 1.

TABLE 1

| | Format | Component 0 | Component 1 | Component 2 |
|---|---|---|---|---|
| 0 | 4:4:4 | R(8bits) | G(8bits) | B(8bits) |
| 1 | 4:4:4 | R(10bits) | G(10bits) | B(10bits) |
| 2 | 4:4:4 | Y(8bits) | Cb(8bits) | Cr(8bits) |
| 3 | 4:4:4 | Y(10bits) | Cb(10bits) | Cr(10bits) |
| 4 | 4:2:2(H2V1) | Y(8bits) | Cb(8bits) | Cr(8bits) |
| 5 | 4:2:2(H2V1) | Y(10bits) | Cb(10bits) | Cr(10bits) |
| 6 | 4:2:2(H1V2) | Y(8bits) | Cb(8bits) | Cr(8bits) |
| 7 | 4:2:2(H1V2) | Y(10bits) | Cb(10bits) | Cr(10bits) |
| 8 | 4:1:1(4:2:0) | Y(8bits) | Cb(8bits) | Cr(8bits) |
| 9 | 4:1:1(4:2:0) | Y(10bits) | Cb(10bits) | Cr(10bits) |
| 10 | Grayscale | Y(8bits) | | |
| 11 | Grayscale | Y(10bits) | | |

As can be seen from TABLE 1, a color format represented by 8 bits or 10 bits is allocated to each of the formats (4:4:4, 4:2:2 (H2V1), 4:2:2 (H1V2), and 4:1:1 (4:2:0)) in this embodiment. Here, RGB formats and YCbCr formats are employed as the color formats.

Input and Output of RGB or YCbCr Image Data in the 4:4:4 Format

An operation of inputting and outputting RGB or YCbCr image data in the 4:4:4 format in chronological order will be described below with reference to FIG. 16A.

Figure 16A:
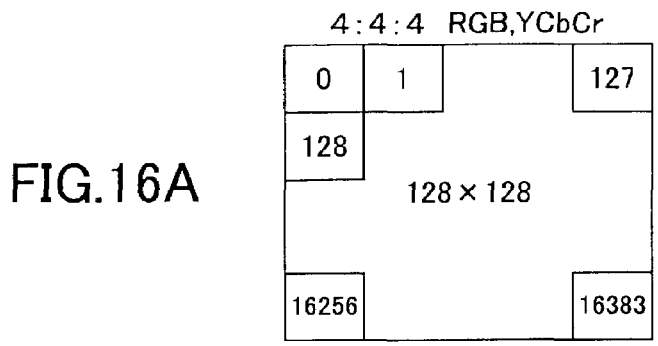
FIG. 16A illustrates an operation of inputting and outputting RGB or YCbCr image data in the 4:4:4 format in chronological order in accordance with the first embodiment of the present invention.

In FIG. 16A, when the RGB or YCbCr image data in the 4:4:4 format are to be input and output, the pixels in each tile are input in a component order such as "R to G to B" or "Y to Cb to Cr". The image data input in such a component order are then output.

Accordingly, the processes for the components ("R, G, B" or "Y, Cb, Cr") are carried out without being separated from each other.

Input and Output of YCbCr Image Data in the 4:2:2 (H2V1) Format

An operation of inputting and outputting YCbCr image data in the 4:2:2 (H2V1) format in chronological order will now be described with reference to FIG. 16B.

Figure 16B:
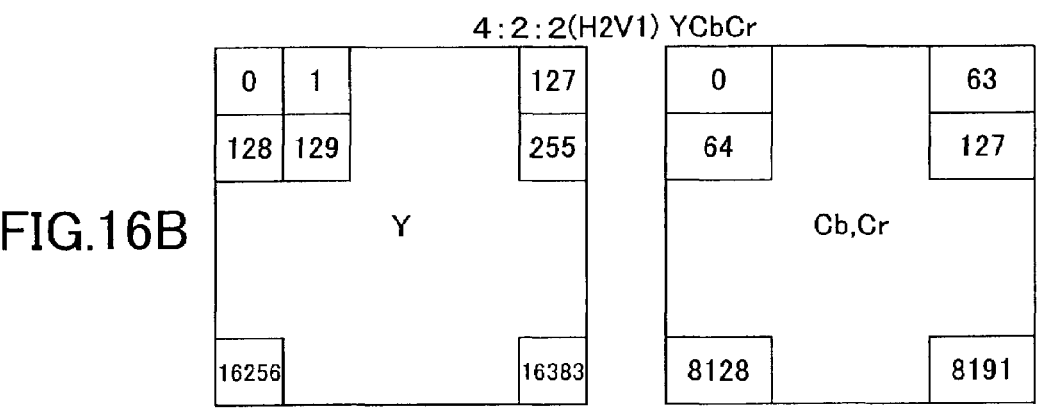
FIG. 16B illustrates an operation of inputting and outputting YCbCr image data in the 4:2:2 (H2V1) format in chronological order in accordance with the first embodiment of the present invention.

In FIG. 16B, when the YCbCr image data in the 4:2:2 (H2V1) format are to be input and output, the process for the component 0 (or Y) is carried out separately from the processes for the components 1 (or Cb) and 2 (or Cr).

More specifically, in FIG. 16B, the process for the component 0 (or Y) involves tiles each consisting of 128×128 pixels, while the processes for the components 1 (or Cb) and 2 (or Cr) involve tiles each consisting of 64×128 pixels.

Input and Output of YCbCr Image Data in the 4:2:2 (H1V2) Format

Figure 16C:
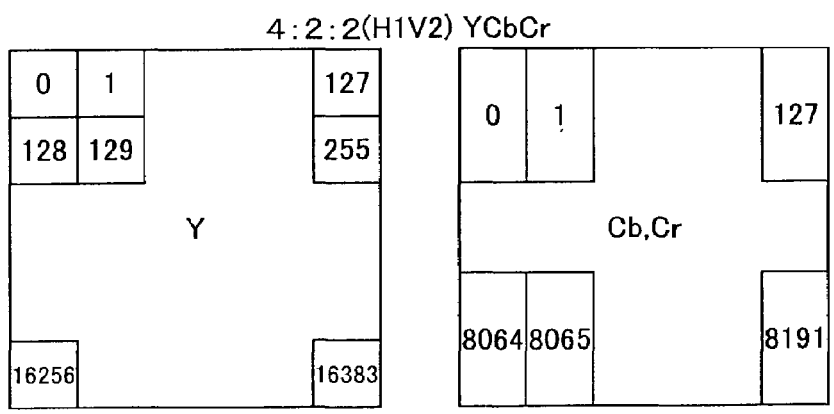
FIG. 16C illustrates an operation of inputting and outputting YCbCr image data in the 4:2:2 (H1V2) format in chronological order in accordance with the first embodiment of the present invention.
Figure 16D:
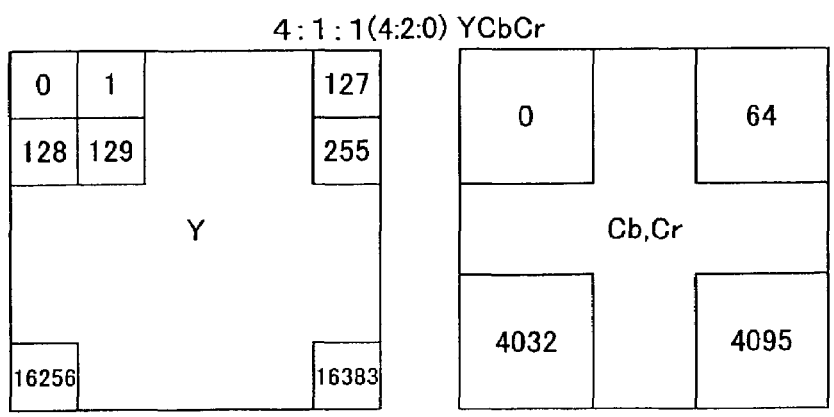
FIG. 16D illustrates an operation of inputting and outputting YCbCr image data in the 4:1:1 (4:2:0) format in chronological order in accordance with the first embodiment of the present invention.

Likewise, when YCbCr image data in the 4:2:2 (H1V2) format are to be input and output, the process for the component 0 (or Y) involves tiles each consisting of 128×128 pixels, while the processes for the components 1 (or Cb) and 2 (or Cr) involve tiles each consisting of 128×64 pixels, as shown in FIG. 16C.

Accordingly, the process for the component Y is also carried out separately from the processes for the components Cb and Cr in this case.

Input and Output of YCbCr Image Data in the 4:1:1 (4:2:0) Format

When YCbCr image data in the 4:1:1 (4:2:0) format are to be input and output, the process for the component 0 (or Y) involves tile each consisting of 128×128 pixels, while the processes for the component 1 (or Cb) and the component 2 (or Cr) involve tiles each consisting of 64×64 pixels.

Accordingly, the process for the component of Y is also carried out separately from the processes for the components of Cb and Cr in this case.

As described above, in a case where image data that have not been thinned are to be input and output, the processes for the components are collectively carried out without being separated from one another. On the other hand, in a case where image data having the components Cb and Cr thinned are to be input and output, the process for the component Y is carried out separately from the processes for the components Cb and Cr. In this manner, an image data input and output method suitable for each of the formats can be achieved.

(Specific Examples of Image Data Input and Output Methods)

Next, specific examples of image data input and output methods for the image formats shown in TABLE 1 will be described in chronological order, with reference to TABLES 2 through 13.

In each of the following tables, image data are made up of R (red), G (green), and B (blue), or consist of Y (brightness) and Cb·Cr (color differences).

In each of the tables, "Clock #" represents the clock number counted from the start of the input (or output) of image data, "Cycle #" represents the cycle number of a repeated process in terms of clocks, and "Pixel #" represents the pixel number of an object to be processed (i.e., the number allocated to each pixel in the tiles shown in FIGS. 16A through 16D, though it only relates to the component 0 (or Y)). The pixel data (3, 2, 1, and 0) indicate the pixel value of each read component.

Also in the tables, "X" indicates that there are no pixel data input and output, and "n" is 0 or a positive integer.

Serial Input and Output of RGB or YCbCr Pixel Data in the 4:4:4 Format

TABLE 2

| Clock # | 0 | 1 | 2 | 3 | 4 | 5 | 6 | 7 | 8 |
|---|---|---|---|---|---|---|---|---|---|
| Cycle # | 0 | 1 | 2 | 0 | 1 | 2 | 0 | 1 | 2 |
| Pixel # | 0 | | | 1 | | | 2 | | |
| Pixel Data | R0(Y0) | G0(Cb0) | B0(Cr0) | R1(Y1) | G1(Cb1) | B1(Cr1) | R2(Y2) | G2(Cb2) | B2(Cr2) |

TABLE 2 shows the chronological data flow in an operation of inputting or outputting RGB or YCbCr pixel data in the 4:4:4 format in the sequential order of the pixels.

As can be seen from TABLE 2, the brightness "Yn" (or "Rn") of a pixel "n" is input (or output) in each cycle "0", the color difference "Cbn" (or "Gn") of the pixel "n" is input (or output) in each cycle "1", and the color difference "Crn" (or "Bn") is input (or output) in each cycle "2". In TABLE 2, the series of operations are considered to be one full cycle. This full cycle is repeated until all the pixels (i.e., 16,384 pixels in a case of a tile consisting of 128×128 pixels) are input or output.

In this manner, the pixel data of each pixel is input or output in 3 clocks, as shown in TABLE 2.

Serial Input and Output of YCbCr Pixel Data in the 4:2:2 (H2V1) or 4:1:1 Format

TABLE 3

(a)
Alternate input and output of Cb and Cr with respect to the pixels

| Clock # | 0 | 1 | 2 | 3 | 4 | 5 | 6 | 7 |
|---|---|---|---|---|---|---|---|---|
| Cycle # | 0 | 1 | 2 | 3 | 0 | 1 | 2 | 3 |
| Pixel # | 0, 1 | | | | 2, 3 | | | |
| Pixel Data | Cb0 | Y0 | Cr0 | Y1 | Cb1 | Y2 | Cr1 | Y3 |

(b)
(4:1:1 Format)

| Clock # | 256 | 257 | 258 | 259 | 260 | 261 | 262 | 263 |
|---|---|---|---|---|---|---|---|---|
| Cycle # | 0 | 1 | 2 | 3 | 0 | 1 | 2 | 3 |
| Pixel # | 128, 129 | | | | 130, 131 | | | |
| Pixel Data | x | Y128 | x | Y129 | x | Y130 | x | Y131 |

TABLE 3 shows the chronological data flow in an operation of inputting or outputting YCbCr pixel data in the 4:2:2 (H2V1) format of the 4:1:1 format in the sequential order of the pixels. In this data flow, the color difference signals Cb and Cr are input (or output) alternately with respect to the pixels.

As can be seen from TABLE 3(a), the color difference "Cbn" of a pixel "n" is input (or output) each cycle "0", the brightness "Yn" of the pixel "n" is input (or output) in each cycle "1", the color difference "Crn" of the pixel "n" is input (or output) in each cycle "2", and the brightness "Yn+1" of the pixel "n+1" is input or output in each cycle 3. In this case, this series of operations are considered to be one full cycle. This full cycle is repeated until all the pixels (i.e., 16,384 pixels in each tile of the component 0 (or Y) consisting of 128×128 pixels, and 8,192 pixels in each tile of the components 1 and 2 consisting of 64×128 pixels) are input or output.

In this case shown in TABLE 3, input or output of the image data of each two pixels is carried out in 4 clocks.

When pixel data in the 4:1:1 format are to be read in, however, the pixel data of the color differences Cb and Cr are not input or output in the pixel data input or output operation performed on each even-number line counted from the top line with respect to the component 0 (or Y), as shown in TABLE 3(b).

Serial Input and Output of YCbCr Pixel Data in the 4:2:2 (H1V2) Format

TABLE 4

(a)
Alternate input and output of Cb and Cr with respect to the lines

| Clock # | 0 | 1 | 2 | 3 | 4 | 5 | 6 | 7 |
|---|---|---|---|---|---|---|---|---|
| Cycle # | 0 | 1 | 0 | 1 | 0 | 1 | 0 | 1 |
| Pixel # | 0 | | 1 | | 2 | | 3 | |
| Pixel Data | Cb0 | Y0 | Cb1 | Y1 | Cb2 | Y2 | Cb3 | Y3 |

TABLE 4-continued (b)

| Clock #    | 256 | 257  | 258 | 259  | 260 | 261  | 262 | 263  |
|------------|-----|------|-----|------|-----|------|-----|------|
| Cycle #    | 0   | 1    | 0   | 1    | 0   | 1    | 0   | 1    |
| Pixel #    | 128 |      | 129 |      | 130 |      | 131 |      |
| Pixel Data | Cr0 | Y128 | Cr1 | Y129 | Cr2 | Y130 | Cr3 | Y131 |

TABLE 4 shows the chronological data flow in an operation of inputting or outputting YCbCr pixel data in the 4:2:2 (H1V2) format. In this data flow, the color difference signals Cb and Cr are input (or output) alternately with respect to the lines.

On each odd-number line with respect to the component 0 (or Y), the color difference "Cbn" of a pixel "n" is input (or output) in each cycle "0", and the brightness "Yn" of the pixel "n" is input (or output) in each cycle "1", as shown in TABLE 4(a). On each even-number line with respect to the component 0 (or Y), the color difference "Crn(Cr0)" of the pixel "n(0)" is input (or output) in each cycle "0" (at the clock "256" in a tile consisting of 128×128 pixels), and the brightness "Yn+127(Y128)" of the pixel "n+127(128)" is input (or output) in each cycle "1" (at the clock "257"), as shown in TABLE 4(b).

In this case, the pixel data of each one pixel is input or output in 2 clocks, and the color difference signals Cb and Cr are input (or output) alternately with respect to the lines.

This cycle is repeated until all the pixels (i.e., 16,384 pixels in a tile consisting of 128×128 pixels for the component 0 (or Y), and 8,192 pixels in a tile consisting of 128×64 pixels for each of the components 1 and 2) are input or output.

In this manner, the pixel data of each one pixel are input or output in 2 clocks.

Serial Input and Output of YCbCr Pixel Data in the 4:2:2 (H2V1 or H1V2) Format

TABLE 5 shows the chronological data flow in an operation of inputting or outputting YCbCr pixel data in the 4:2:2 (H2V1 or H1V2) format in the sequential order of the tiles. In this data flow, the brightness signals Y are first input or output for one tile, and the color difference signals Cb and Cr are then alternately input for the tile.

As can be seen from TABLE 5(a), the brightness signals Y ("Y0" through "Y16383") of one tile are first input or output in an operation lasting from the clock "0" until the clock "16383". The color difference signals Cb and Cr ("Cb0" through "Cb8191" and "Cr0" through "Cr8191") of the tile are then alternately input or output in an operation lasting from the clock "16384" until the clock "32767", as shown in TABLE 5(b).

In this manner, the pixel data of each one pixel are input or output in 2 clocks in this structure.

Two-Data Parallel Input and Output of RGB or YCbCr Pixel Data in the 4:4:4 Format

TABLE 6

| Clock #      | 0       | 1       | 2       | 3       | 4       | 5       | 6       | 7       |
|--------------|---------|---------|---------|---------|---------|---------|---------|---------|
| Cycle #      | 0       | 1       | 0       | 1       | 0       | 1       | 0       | 1       |
| Pixel #      | 0       |         | 1       |         | 2       |         | 3       |         |
| Pixel Data 1 | R0(Y0)  | x       | R1(Y1)  | x       | R2(Y2)  | x       | R3(Y3)  | x       |
| Pixel Data 0 | G0(Cb0) | B0(Cr0) | G1(Cb1) | B1(Cr1) | G2(Cb2) | B2(Cr2) | G3(Cb3) | B3(Cr3) |

TABLE 6 shows the chronological data flow in an operation of parallel-inputting or parallel-outputting each two pieces of RGB or YCbCr pixel data of in the 4:4:4 format in the sequential order of the pixels.

As can be seen from TABLE 6, the brightness "Yn" (or "Rn") and the color difference "Cbn" (or "Gn") of a pixel "n" are input (or output) in each cycle "0", and the color difference "Crn" (or "Bn") is input (or output) in each cycle "1". This series of operations is considered to be one full cycle. This full cycle is repeated until all the pixels (i.e., 16,384 pixels in a tile consisting of 128×128 pixels) are input or output.

In this manner, the pixel data of each one pixel are input or output in 2 clocks in this structure.

TABLE 5

(a)
After input (or output) of brightness signals of one tile,
color difference signals of the same tile are alternately inputted (or outputted)

| Clock #    | 0     | 1     | 2     | 3     | 4     | 5     | 6     | 7     |
|------------|-------|-------|-------|-------|-------|-------|-------|-------|
| Cycle #    | 0     | 1     | 0     | 1     | 0     | 1     | 0     | 1     |
| Pixel #    | 0     | 1     | 2     | 3     | 4     | 5     | 6     | 7     |
| Pixel Data | Y0    | Y1    | Y2    | Y3    | Y4    | Y5    | Y6    | Y7    |

(b)

| Clock #    | 16384 | 16385 | 16386 | 16387 | 16388 | 16389 | 16340 | 16342 |
|------------|-------|-------|-------|-------|-------|-------|-------|-------|
| Cycle #    | 0     | 1     | 0     | 1     | 0     | 1     | 0     | 1     |
| Pixel #    | 0, 1  |       | 2, 3  |       | 4, 5  |       | 6, 7  |       |
| Pixel Data | Cb0   | Cr0   | Cb1   | Cr1   | Cb2   | Cr2   | Cb3   | Cr3   |

Two-Data Parallel Input and Output of YCbCr Pixel Data in the 4:2:2 (H2V1) or 4:1:1 Format

TABLE 7

(a)
After input (or output) of brightness signals of one tile, color difference signals of the same tile are alternately inputted (or outputted)

| Clock # | 0 | 1 | 2 | 3 | 4 | 5 | 6 | 7 |
|---|---|---|---|---|---|---|---|---|
| Cycle # | 0 | | 1 | | 0 | | 1 | |
| Pixel # | 0, 1 | | | | 2, 3 | | | |
| Pixel Data 1 | Y0 | | Y1 | | Y2 | | Y3 | |
| Pixel Data 0 | Cb0 | | Cr0 | | Cb1 | | Cr1 | |

(b)
(4:1:1 Format)

| Clock # | 256 | 257 | 258 | 259 | 260 | 261 | 262 | 263 |
|---|---|---|---|---|---|---|---|---|
| Cycle # | 0 | | 1 | | 0 | | 1 | |
| Pixel # | 128, 129 | | | | 130, 131 | | | |
| Pixel Data 1 | Y128 | | Y129 | | Y130 | | Y131 | |
| Pixel Data 0 | x | | x | | x | | x | |

TABLE 7 shows the chronological data flow in an operation of parallel-inputting or parallel-outputting each two pieces of YCbCr pixel data of in the 4:2:2 (H2V1) or 4:1:1 format in the sequential order of the pixels. In this data flow, the color difference signals Cb and Cr are input (or output) alternately with respect to the pixels.

As can be seen from TABLE 7(a), the brightness "Yn" and the color difference "Cbn" of a pixel "n" are input (or output) in each cycle "0", and the brightness "Yn+1" of the pixel "n+1" and the color difference "Crn" of the pixel "n" are input (or output) in each cycle "1". Here, this series of operations are considered to be one full cycle. This full cycle is repeated until all the pixels (i.e., 16,384 pixels in a tile consisting of 128×128 pixels for the component 0 (or Y), and 8,192 pixels in a tile consisting of 64×128 pixels for each of the components 1 and 2) are input or output.

In this manner, the pixel data of each two pixels are input or output in 4 clocks in this structure.

When image data in the 4:1:1 format are to be read in, however, the pixel data of the color differences Cb and Cr are not input (or output) in the pixel data input or output operation performed on each even-number line from the top line with respect to the component 0 (or Y), as shown in TABLE 7(b).

Two-Data Parallel Input and Output of YCbCr Pixel Data in the 4:2:2 (H1V2) Format

TABLE 8

(a)
Alternate input and output of Cb and Cr with respect to the lines

| Clock # | 0 | 1 | 2 | 3 | 4 | 5 | 6 | 7 |
|---|---|---|---|---|---|---|---|---|
| Cycle # | 0 | | 1 | | 0 | | 1 | |
| Pixel # | 0 | | 1 | | 2 | | 3 | |
| Pixel Data 1 | Y0 | | Y1 | | Y2 | | Y3 | |
| Pixel Data 0 | Cb0 | | Cb1 | | Cb2 | | Cb3 | |

(b)

| Clock # | 256 | 257 | 258 | 259 | 260 | 261 | 262 | 263 |
|---|---|---|---|---|---|---|---|---|
| Cycle # | 0 | | 1 | | 0 | | 1 | |
| Pixel # | 128 | | 129 | | 130 | | 131 | |
| Pixel Data 1 | Y128 | | Y129 | | Y130 | | Y131 | |
| Pixel Data 0 | Cr0 | | Cr1 | | Cr2 | | Cr3 | |

TABLE 8 shows the chronological data flow in an operation of parallel-inputting or parallel-outputting two pieces of YCbCr pixel data of each pixel in the 4:2:2 (H1V2) format in the sequential order of the pixels. In this data flow, the color difference signals Cb and Cr are input (or output) alternately with respect to the lines.

On each odd-number line with respect to the component 0 (or Y), the brightness "Yn" and the color difference "Cbn" of a pixel "n" are input (or output) in each cycle "0", as shown in TABLE 8(a). On each even-number line with respect to the component 0 (or Y), the brightness "Yn+127 (Y128)" of the pixel "n+127(128)" and the color difference "Crn (Cr0)" of the pixel "n(0)" are input (or output) in each cycle "0" (at the clocks 256 and 257, for example, in a tile consisting of 128×128 pixels), as shown in TABLE 8(b).

In this case, one cycle consists of two cycles, and the color difference signals Cb and Cr are input (or output) alternately with respect to the lines, as shown in TABLE 8.

This cycle is repeated until all the pixels (i.e., 16,384 pixels in a tile consisting of 128×128 pixels for the component 0 (or Y), or 8,192 pixels in a tile consisting of 128×64 pixels for each of the components 1 and 2) are input or output.

In this manner, the pixel data of each one pixel are inputted or outputted in 2 clocks, as shown in TABLE 8.

Three-Data Parallel Input and Output of RGB or YCbCr Pixel Data in the 4:4:4 Format

TABLE 9

| Clock # | 0 | 1 | 2 | 3 | 4 | 5 | 6 | 7 |
|---|---|---|---|---|---|---|---|---|
| Cycle # | 0 | | 0 | | 0 | | 0 | |
| Pixel # | 0 | | 1 | | 2 | | 3 | |
| Pixel Data 2 | R0(Y0) | | R1(Y1) | | R2(Y2) | | R3(Y3) | |
| Pixel Data 1 | G0(Cb0) | | G1(Cb1) | | G2(Cb2) | | G3(Cb3) | |
| Pixel Data 0 | B0(Cr0) | | B1(Cr1) | | B2(Cr2) | | B3(Cr3) | |

TABLE 9 shows the chronological data flow in an operation of inputting or outputting three pieces of RGB or YCbCr pixel data of each pixel in the 4:4:4 format in the sequential order of the pixels.

As can be seen from TABLE 9, the brightness "Yn" (or "Rn"), the color difference "Cbn" (or "Gn"), and the color difference "Crn" (or "Bn") of a pixel "n" are input (or output) in each cycle "0". In TABLE 9, this series of operations are considered to be one full cycle. This full cycle is repeated until all the pixels (i.e., 16,384 pixels in a tile consisting of 128×128 pixels) are input or output.

In this manner, the pixel data of each one pixels are input or output in 2 clocks, as shown in TABLE 9.

Four-Data Parallel Input and Output of YCbCr Pixel Data in the 4:2:2 (H2V1) or 4:1:1 Format

TABLE 10

(a)
Pixel data 2 being Cb, and pixel data 0 being Cr

| Clock # | 0 | 1 | 2 | 3 | 4 | 5 | 6 | 7 |
|---|---|---|---|---|---|---|---|---|
| Cycle # | 0 | | | | 0 | | | |
| Pixel # | 0, 1 | | | | 2, 3 | | | |
| Pixel Data 3 | Y0 | | | | Y2 | | | |
| Pixel Data 2 | Cb0 | | | | Cb1 | | | |
| Pixel Data 1 | Y1 | | | | Y3 | | | |
| Pixel Data 0 | Cr0 | | | | Cr1 | | | |

(b)
(4:1:1 Format)

| Clock # | 256 | 257 | 258 | 259 | 260 | 261 | 262 | 263 |
|---|---|---|---|---|---|---|---|---|
| Cycle # | 0 | | | | 0 | | | |
| Pixel # | 128, 129 | | | | 130, 131 | | | |
| Pixel Data 3 | Y128 | | | | Y130 | | | |

TABLE 10-continued

| Pixel Data 2 | x    | x    |
|--------------|------|------|
| Pixel Data 1 | Y129 | Y131 |
| Pixel Data 0 | x    | x    |

TABLE 10 shows the chronological data flow in an operation of inputting or outputting each four pieces of YCbCr pixel data of in the 4:2:2 (H2V1) or 4:1:1 format in the sequential order of the pixels. In this data flow, the color difference signals Cb and Cr are input (or output) alternately with respect to the pixels.

As can be seen from TABLE 10(a), the brightness "Yn", the color difference "Cbn", and the color difference "Crn" of a pixel "n", and the brightness "Yn+1" of the pixel "n+1" are input (or output) in each cycle "0". In TABLE 10, this series of operations are considered to be one full cycle. This cycle is repeated until all the pixels (i.e., 16,384 pixels in a tile consisting of 128×128 pixels for the component 0 (or Y), or 8,192 pixels in a tile consisting of 64×128 pixels for each of the components 1 and 2) are input or output.

In this manner, the pixel data of each two pixels are input or output in 4 clocks, as shown in TABLE 10.

When pixel data in the 4:1:1 format are to be read in, however, the pixel data of the color differences Cb and Cr are not input (or output) in the pixel data input or output operation performed on each even-number line counted from the top line with respect to the component 0 (or Y), as shown in TABLE 10(b).

Four-Data Parallel Input and Output of YCbCr Pixel Data in the 4:2:2 (H1V2) Format

TABLE 11

(a)
Alternate input or output of Cb and Cr with respect to the lines

| Clock #      | 0 | 1    | 2 | 3 | 4 | 5    | 6 | 7 |
|--------------|---|------|---|---|---|------|---|---|
| Cycle #      |   | 0    |   |   |   | 0    |   |   |
| Pixel #      |   | 0, 1 |   |   |   | 2, 3 |   |   |
| Pixel Data 3 |   | Y0   |   |   |   | Y2   |   |   |
| Pixel Data 2 |   | Cb0  |   |   |   | Cb2  |   |   |
| Pixel Data 1 |   | Y1   |   |   |   | Y2   |   |   |
| Pixel Data 0 |   | Cb1  |   |   |   | Cb3  |   |   |

(b)
(4:1:1 Format)

| Clock #      | 256 | 257      | 258 | 259 | 260 | 261      | 262 | 263 |
|--------------|-----|----------|-----|-----|-----|----------|-----|-----|
| Cycle #      |     | 0        |     |     |     | 0        |     |     |
| Pixel #      |     | 128, 129 |     |     |     | 130, 131 |     |     |
| Pixel Data 3 |     | Y128     |     |     |     | Y130     |     |     |
| Pixel Data 2 |     | Cr0      |     |     |     | Cr2      |     |     |
| Pixel Data 1 |     | Y129     |     |     |     | Y131     |     |     |
| Pixel Data 0 |     | Cr1      |     |     |     | Cr3      |     |     |

TABLE 11 shows the chronological data flow in an operation of inputting or outputting each four pieces of YCbCr pixel data in the 4:2:2 (H1V2) format in the sequential order of the pixels. In this data flow, the color difference signals Cb and Cr are input (or output) alternately with respect to the lines.

On each odd-number line with respect to the component 0 (or Y), the brightness "Yn" and the color difference "Cbn" of a pixel "n", and the brightness "Yn+1" and the color difference "Cbn+1" of the pixel "n+1" are input (or output) in each cycle "0", as shown in TABLE 11(a). On each odd-number line with respect to the component 0 (or Y), the brightness "Yn+127(Y128)" of the pixel "n+127(128)", the color difference "Crn(Cr0)" of the pixel "n(0)", the brightness "Yn+128 (Y129)" of the pixel "n+128(129)", and the color difference "Crn+1(Cr1)" of the pixel "n+1(1)" are input (or output) in each cycle "0" (for example, at the clocks 256, 257, 258, and 259, in a case where each tile consists of 128×128 pixels), as shown in TABLE 11(b)

In TABLE 11, one cycle consists of 4 clocks, and the color difference signals Cb and Cr are input (or output) alternately with respect to the lines.

This cycle is repeated until all the pixels (i.e., 16,384 pixels in a tile consisting of 128×128 pixels for the component 0 (or Y), and 8,192 pixels in a tile consisting of 128×64 pixels for each of the components 1 and 2) are input or output.

In this manner, the pixel data of each two pixels are input or output in 4 clocks, as shown in TABLE 11.

Serial Input and Output of Pixel Data in the Grayscale Format

TABLE 12

| Clock #    | 0 | 1  | 2 | 3  | 4 | 5  | 6 | 7  |
|------------|---|----|---|----|---|----|---|----|
| Cycle #    |   | 0  |   | 0  |   | 0  |   | 0  |
| Pixel #    |   | 0  |   | 1  |   | 2  |   | 3  |
| Pixel Data |   | Y0 |   | Y1 |   | Y2 |   | Y3 |

TABLE 12 shows the chronological data flow in an operation of inputting or outputting pixel data in the grayscale format in the sequential order of the pixels.

As can be seen from TABLE 12, the brightness "Yn" of a pixel "n" is input (or output) in each cycle "0". This operation is performed in one cycle. This one cycle of operation is repeated until all the pixels (i.e., 16,384 pixels in a tile consisting of 128×128 pixels) are input or output.

In this manner, the pixel data of each one pixel are input or output in 2 clocks, as shown in TABLE 12.

Two-Data Parallel Input and Output of Pixel Data in the Grayscale Format

TABLE 13

| Clock #      | 0 | 1   | 2 | 3 | 4 | 5   | 6 | 7 |
|--------------|---|-----|---|---|---|-----|---|---|
| Cycle #      |   | 0   |   |   |   | 0   |   |   |
| Pixel #      |   | 0.1 |   |   |   | 2.3 |   |   |
| Pixel Data 2 |   | Y0  |   |   |   | Y2  |   |   |
| Pixel Data 1 |   | Y1  |   |   |   | Y3  |   |   |

TABLE 13 shows the chronological data flow in an operation of inputting or outputting the pixel data of each two pixels in the grayscale format in the sequential order of the pixels.

As can be seen from TABLE 13, the brightness "Yn" of a pixel "n" and the brightness "Yn+1" of the pixel "n+1" are input (or output) in each cycle "0". In TABLE 13, this operation is performed in one cycle. This cycle of operation is repeated until all the pixels (i.e., 16,384 pixels in a tile consisting of 128×128 pixels) are input or output.

In this manner, the pixel data of each two pixels are input or output in 4 clocks, as shown in TABLE 13.

By the above described operations of inputting or outputting data, RGB or YCbCr image data in the 4:4:4 format are input or output sequentially in terms of the pixels, and image data in any other format are input or output in such a manner that the brightness signals (Y) of pixel data are input or output separately from the color difference signals Cb and Cr in terms of the tiles.

Also, as shown in TABLES 6-11, and 13, a plurality of pieces of pixel data can be simultaneously processed in this embodiment.

(Timing Chart Example)

Figure 17:
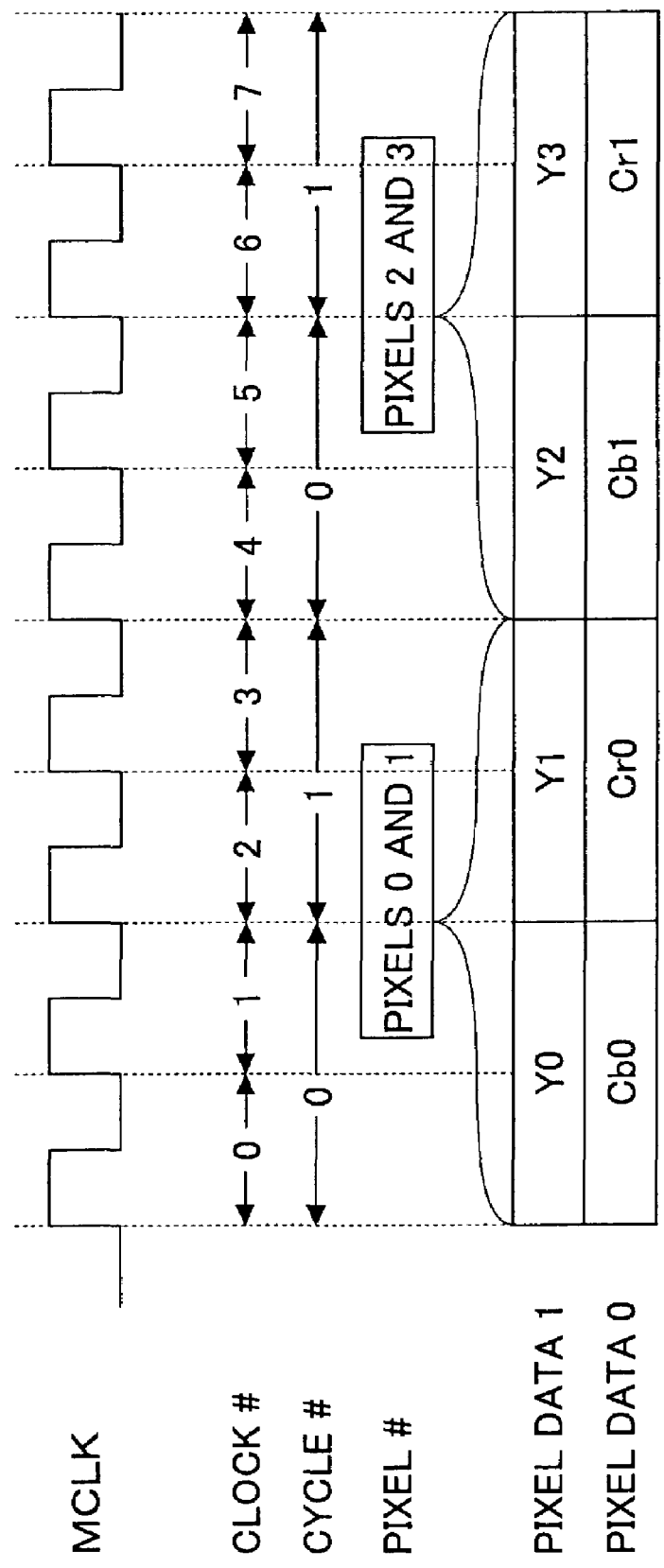
FIG. 17 is a timing chart showing the data flow in operation of inputting or outputting each two pieces of pixel data in the 4:2:2 (H2V1) format or the 4:1:1 format (YCbCr) shown in TABLE 7 in the sequential order of the pixels.

Referring now to FIG. 17, an example of a timing chart in a case where two pieces of YCbCr pixel data in the 4:2:2 (H2V1) or 4:1:1 format are simultaneously input or output in one operation in the sequential order of the pixels, as shown in TABLE 7.

As can be seen from FIG. 17, in an operation of simultaneously inputting or outputting two pieces of YCbCr pixel data in the 4:2:2 (H2V1) or 4:1:1 format, four clocks constitute one cycle, and each one cycle is divided into the cycle "0" and the cycle "1" each consisting of 2 clocks.

More specifically, when the cycle "0" starts, the brightness "Y0" and the color difference "Cbn" of the pixel "0" are input (or output) as the image data 1 and image data 0. When the cycle "1" starts next, the brightness "Y1" of the pixel "1" and the color difference "Cr0" of the pixel "0" are input (or output) as the image data 1 and image data 0. This operation is repeated thereafter.

As for any of the tables other than TABLE 7, it is possible to draw a corresponding timing chart in the same manner as in FIG. 17.

As described so far, image data read by the image reading unit 500 are input into the encoding and decoding process unit 200 (the encoding function block) in accordance with the present invention. Thus, efficient encoding can be achieved.

It should be noted that the present invention is not limited to the embodiments specifically disclosed above, but other variations and modifications may be made without departing from the scope of the present invention.

What is claimed is:

1. An image processing device comprising:
a wavelet transformer that performs a horizontal and/or vertical wavelet transform on image data in one or more stages,
the wavelet transformer not performing said horizontal and/or vertical wavelet transform on the image data in a predetermined stage,
wherein the wavelet transformer does not perform said wavelet transform in a predetermined direction in the predetermined stage where lines in the predetermined direction have been thinned in the image data, but performs said wavelet transform in every stage where no lines have been thinned in the image data.

2. The image processing device as claimed in claim 1, further comprising:
an encoder that encodes coefficient data generated by the wavelet transformer,
the encoder not encoding a predetermined sub-band, where the coefficient data do not include information corresponding to the predetermined sub-band.

3. An image processing device comprising:
a two-dimensional wavelet transformer that performs a two-dimensional wavelet transform in one or more stages, and comprises a one-dimensional horizontal wavelet transformer that performs a one-dimensional wavelet transform in the horizontal direction on image data produced for each of a plurality of components, and a one-dimensional vertical wavelet transformer that performs a one-dimensional wavelet transform in the vertical direction on the image data; and an input-output switcher tat switches inputs and outputs of the one-dimensional horizontal wavelet transformer and/or the one-dimensional vertical wavelet transformer in a first stage,
the input-output switcher switching the inputs and outputs so as not to perform said one-dimensional wavelet transform in a predetermined direction in the first stage, where lines in the predetermined direction have been thinned in the image data.

4. The image processing device as claimed in claim 3, further comprising an input switcher that switches inputs for the latter half of the first stage,
the input switcher switching the inputs so that coefficient data generated through said two-dimensional wavelet transform performed in the first stage are input in the latter half of the first stage, where no lines have been thinned in the image data.

5. An image processing device comprising:
an inverse wavelet transformer that performs a horizontal and/or vertical inverse wavelet transform on coefficient data comprising a plurality of sub-bands generated through a wavelet transform,
wherein in at least one level, the inverse wavelet transformer does nor perform at least one of a horizontal inverse wavelet transform and a vertical inverse wavelet transform on the coefficient data, when the format of image data to be produced is one of 4:4:4, 4:2:2 (H2V1), 4:2:2 (H1V2), and 4:1:1 (H1V1).

6. An image processing device comprising:
a two-dimensional inverse wavelet transformer that performs a two-dimensional inverse wavelet transform in one or more stages, and comprises a one-dimensional horizontal inverse wavelet transformer that performs a one-dimensional inverse wavelet transform in the horizontal direction on coefficient data comprising one or more sub-bands, and a one-dimensional vertical inverse wavelet transformer that performs a one-dimensional inverse wavelet transform in the vertical direction on the coefficient data; and
an input-output switcher that switches inputs and outputs of the one-dimensional horizontal inverse wavelet transformer and/or the one-dimensional vertical inverse wavelet transformer in the last stage,
the input-output switcher switching the inputs and outputs so as not to perform said one-dimensional inverse wavelet transform in the horizontal direction and/or the vertical direction in the last stage, depending on the configuration of the image data to be produced.

7. The image forming apparatus as claimed in claim 6, further comprising:
an input switcher that switches inputs for the latter half of the last stage,
the input switcher switching the inputs so that image data not having a two-dimensional inverse wavelet transform performed thereon in the last stage are input in the latter half of the last stage, where image data having said coefficient data that have not been subjected to the two-dimensional inverse wavelet transform in the last stage are to be produced.

8. An image processing device comprising:
a pixel data reader that reads pixel data of each of a plurality of components from an image,
the pixel data reader switching amongst the components the pixel data to be input for each pixel, tile or line, wherein
the plurality of components comprise a first component, a second component, and a third component, and the pixel data reader switches the components so as to read the pixel data of the first component, the pixel data of the second component, and the pixel data of the third component at a ratio of 2:1:1, where lines in the vertical direction are to be thinned in the image data of the second and third components.

9. The image processing device as claimed in claim 8, wherein the pixel data reader reads pixel data of different components one at a time, or two or more at once.

10. The image processing device as claimed in claim 8, wherein the pixel data reader reads the vertical-direction pixel data of the second and third components from every other pixel, where lines in the horizontal direction are also to be thinned in the image data of the second and third components.

11. An image processing device comprising:
a pixel data reader that reads pixel data of each of a plurality of components from an image,
the pixel data reader switching amongst the components the pixel data to be input for each pixel, tile or line, wherein
the plurality of components comprise a first component, a second component, and a third component, and
the pixel data reader switches the components so as to read the pixel data of the first component and the pixel data of the second component or the third component at a ratio of 2:1, and also switches the second component and the third component for each line, where lines in the horizontal direction are to be thinned in the image data of the second component and the third component.

12. An image processing method comprising:
performing a wavelet transform on image data in the horizontal direction and/or the vertical direction in one or more stages,
the step of performing said wavelet transform not being carried out in a predetermined stage, wherein
the step of performing said wavelet transform does not involve said wavelet transform in a predetermined direction in the predetermined stage where lines in the predetermined direction have been thinned in the image data, but involves said wavelet transform in every stage where no lines have been thinned in the image data.

13. The image processing method as claimed in claim 12, further comprising the steps of:
encoding coefficient data produced in the step of performing a wavelet transform; and
encoding not being performed on a predetermined sub-band, where the coefficient data do not include information corresponding to the predetermined sub-band.

14. An image processing method comprising the steps of:
performing an inverse wavelet transform of the horizontal direction and/or the vertical direction on coefficient data comprising a plurality of sub-bands generated through a wavelet transform,
wherein in at least one level, at least one of a horizontal inverse wavelet transform and a vertical inverse wavelet transform is not carried out on the coefficient data, when the format of image data to be produced is one of 4:4:4, 4:2:2 (H2V1), 4:2:2 (H1V2), and 4:1:1 (H1V1).

15. An image reading method comprising:
reading pixel data of each of a plurality of components from an image,
the step of reading the pixel data involving switching amongst the components the pixel data to be input for each pixel, tile or line, wherein
the plurality of components comprise a first component, a second component, and a third component, and
the step of reading the pixel data involves switching the components so as to read the pixel data of the first component, the pixel data of the second component, and the pixel data of the third component at a ratio of 2:1:1, where lines in the vertical direction are to be thinned in image data of the second component and the third component.

16. The image reading method as claimed in claim 15, wherein the step of reading the pixel data involves reading the pixel data of different components, one at a time, or two or more at once.

17. The image reading method as claimed in claim 15, wherein the step of reading the pixel data involves reading the vertical-direction pixel data of the second component and the third component from every other pixel, where lines in the horizontal direction are also to be thinned in the image data of the second component and the third component.

18. An image reading method comprising:
reading pixel data of each of a plurality of components from an image,
the step of reading the pixel data involving switching amongst the components the pixel data to be input for each pixel, tile or line, wherein
the plurality of components include a first component, a second component, and a third component, and
the step of reading the pixel data involves switching the components so as to read the pixel data of the first component and the pixel data of the second component or the third component at a ratio of 2:1, and also involves switching the second component and the third component for each line, where lines in the horizontal direction are to be thinned in the image data of the second component and the third component.

* * * * *